(12) United States Patent
Mizusaki et al.

(10) Patent No.: US 10,877,304 B2
(45) Date of Patent: Dec. 29, 2020

(54) LIQUID CRYSTAL DISPLAY DEVICE AND METHOD FOR MANUFACTURING LIQUID CRYSTAL DISPLAY DEVICE

(71) Applicant: SHARP KABUSHIKI KAISHA, Sakai (JP)

(72) Inventors: Masanobu Mizusaki, Sakai (JP); Hiroshi Tsuchiya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 193 days.

(21) Appl. No.: 16/067,517

(22) PCT Filed: Dec. 28, 2016

(86) PCT No.: PCT/JP2016/089011
§ 371 (c)(1),
(2) Date: Jun. 29, 2018

(87) PCT Pub. No.: WO2017/119376
PCT Pub. Date: Jul. 13, 2017

(65) Prior Publication Data
US 2019/0011736 A1  Jan. 10, 2019

(30) Foreign Application Priority Data
Jan. 7, 2016 (JP) ................................. 2016-002039

(51) Int. Cl.
*G02F 1/1334* (2006.01)
*C08G 59/40* (2006.01)
(Continued)

(52) U.S. Cl.
CPC ......... *G02F 1/1334* (2013.01); *C08G 59/245* (2013.01); *C08G 59/4035* (2013.01);
(Continued)

(58) Field of Classification Search
CPC ................. G02F 1/1334; G02F 1/1337; G02F 1/133711; G02F 1/13363; C08L 63/00;
(Continued)

(56) References Cited

U.S. PATENT DOCUMENTS

2005/0116200 A1  6/2005 Nakanishi et al.
2014/0308531 A1* 10/2014 Miao ...................... C09D 11/02
                                                              428/471
2016/0369168 A1* 12/2016 Furusato ........... G02F 1/133711

FOREIGN PATENT DOCUMENTS

EP            0803525 A2 * 10/1997  ............. C08G 59/18
JP         2003-307720 A    10/2003

* cited by examiner

*Primary Examiner* — Ruiyun Zhang
(74) *Attorney, Agent, or Firm* — ScienBiziP, P.C.

(57) ABSTRACT

With the use of a photoalignment film, the present invention provides a liquid crystal display device capable of maintaining a favorable voltage holding ratio and reducing or preventing image sticking, stains, and a decrease in contrast ratio for a long time not only in a room-temperature environment but also in a high-temperature environment; and a method for producing such a liquid crystal display device. The liquid crystal display device of the present invention includes paired substrates; a liquid crystal layer disposed between the substrates; a photoalignment film disposed between at least one of the substrates and the liquid crystal layer; and a polymer layer disposed between the photoalignment film and the liquid crystal layer, wherein the polymer layer has a structure derived from a specific epoxy-based monomer and a structure derived from a specific curing agent.

11 Claims, 2 Drawing Sheets

(51) Int. Cl.
    *C08G 59/50*         (2006.01)
    *C08G 59/24*         (2006.01)
    *G02F 1/1337*       (2006.01)
    *C08L 63/00*         (2006.01)
    *C09K 19/54*         (2006.01)
    *G02F 1/13363*      (2006.01)
    *C09K 19/04*         (2006.01)

(52) U.S. Cl.
    CPC ..... *C08G 59/5026* (2013.01); *C08G 59/5033* (2013.01); *C08L 63/00* (2013.01); *C09K 19/542* (2013.01); *G02F 1/13363* (2013.01); *G02F 1/133711* (2013.01); *G02F 1/133788* (2013.01); *C08L 2203/20* (2013.01); *C09K 2019/0448* (2013.01); *C09K 2019/546* (2013.01); *C09K 2219/03* (2013.01); *C09K 2323/00* (2020.08); *C09K 2323/02* (2020.08); *C09K 2323/027* (2020.08); *G02F 2001/133715* (2013.01)

(58) Field of Classification Search
    CPC ............ C08G 59/5026; C08G 59/4035; C08G 59/245; C08G 59/5033; C09K 2019/0448; C09K 2219/03; Y10T 428/10; Y10T 428/1005; Y10T 428/1023
    USPC .......... 428/1.1, 1.2, 1.26; 349/123, 130, 127
    See application file for complete search history.

Thermal curing

LIQUID CRYSTAL DISPLAY DEVICE AND METHOD FOR MANUFACTURING LIQUID CRYSTAL DISPLAY DEVICE

TECHNICAL FIELD

The present invention relates to liquid crystal display devices and methods for producing a liquid crystal display device. More specifically, the present invention relates to a liquid crystal display device configured to control the alignment of liquid crystal molecules with a photoalignment film and a method for manufacturing a liquid crystal display device.

BACKGROUND ART

Liquid crystal display devices are display devices utilizing a liquid crystal composition for display. The typical display mode thereof is irradiating a liquid crystal panel containing a liquid crystal composition sealed between paired substrates with light from a backlight and applying voltage to the liquid crystal composition to change the alignment of liquid crystal molecules, thereby controlling the amount of light passing through the liquid crystal panel. Such liquid crystal display devices have features including a thin profile, light weight, and low power consumption, and have therefore been used for electronic devices such as smartphones, tablet PCs, and car navigation systems. The pixel resolution has been increased for uses such as smartphones, which has led to a tendency of an increase in the number of conductive lines and the area of the black matrix disposed in the liquid crystal panel.

In a liquid crystal display device, the alignment of liquid crystal molecules with no voltage applied is typically controlled by alignment films on which an alignment treatment has been performed. The alignment treatment has conventionally been performed by the rubbing method of rubbing the surface of an alignment film with a tool such as a roller. However, since the number of the conductive lines and the area of the black matrix disposed in the liquid crystal panel have been increased, irregularities are now more likely to occur on the substrate surfaces in the liquid crystal panel. With irregularities on the substrate surfaces, the portions near the irregularities may not be properly rubbed by the rubbing method. Such a non-uniform alignment treatment may cause a decrease in contrast ratio in the liquid crystal display device.

In order to deal with this problem, studies and development have been made on a photoalignment method which is an alignment treatment method alternative to the rubbing method and irradiates the surface of an alignment film with light. With the photoalignment method, an alignment treatment can be performed without contact with the surface of the alignment film. The photoalignment method therefore has an advantage that an alignment treatment is less likely to be non-uniform even with irregularities on the substrate surfaces, so that a favorable liquid crystal alignment can be achieved on the entire substrates.

Meanwhile, display defects such as image sticking may occur in conventional liquid crystal display devices, and improvements have been required in this respect. As a method to reduce image sticking, a technique has been examined in which a liquid crystal material containing polymerizable monomers are injected between paired substrates, and these monomers are polymerized under application of a voltage to store the direction in which the liquid crystal molecules are tilted. For example, Patent Literature 1 discloses use of monomers having a specific structure to reduce image sticking.

CITATION LIST

Patent Literature

Patent Literature 1: JP 2003-307720 A

SUMMARY OF INVENTION

Technical Problem

A liquid crystal display device including a photoalignment film containing a photoreactive functional group (hereinafter also referred to as a "photoalignment liquid crystal display") may sometimes suffer image sticking and stains on the display screen. As a result of studies, the present inventors figured that image sticking and stains in the photoalignment liquid crystal display would occur in the following manner.

Irradiating a photoalignment film with light (e.g., light from a backlight including visible light and ultraviolet light) causes decomposition of photoreactive functional groups, resulting in radicals. For example, an azobenzene group, which is a photoreactive functional group, generates radicals by absorbing light as shown below.

[Chem. 1]

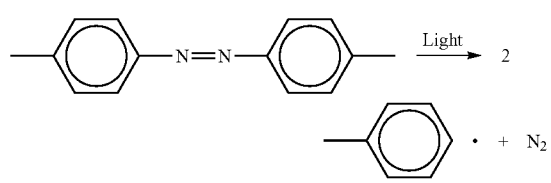

Some of the radicals generated are easily transferred to liquid crystal molecules in the liquid crystal layer. The radicals transferred are ultimately ionized. This decreases the voltage holding ratio (hereinafter also referred to as "VHR") and causes image sticking and/or stains.

When a photoalignment liquid crystal display is left in a high-temperature environment, radicals in a photoalignment film easily dissolve into the liquid crystal layer, likely causing image sticking and stains attributable to a low VHR. Further, leaving the photoalignment liquid crystal display in a high-temperature environment for a long time may reduce the contrast ratio. This is also considered to be attributable to ultimate ionization of radicals generated from the photoalignment film and transferred to liquid crystal molecules.

As a method for decreasing radicals in the liquid crystal layer, a method for dissolving a radical scavenger in the liquid crystal layer has been studied. Yet, since the radical scavenger can freely diffuse in the liquid crystal layer, the radical scavenger may react with specific components contained in the alignment film, seal, or the like, forming impurities. In addition, the radical scavenger remaining in the liquid crystal layer may cause a thermal reaction or may slightly change the physical properties of the liquid crystal material.

The present invention was made in view of the current situation described above. With the use of a photoalignment film, the present invention aims to provide a liquid crystal display device capable of maintaining a favorable voltage holding ratio and reducing or preventing image sticking, stains, and a decrease in contrast ratio for a long time not only in a room-temperature environment but also in a high-temperature environment; and a method for producing such a liquid crystal display device.

Solution to Problem

With regard to a photoalignment liquid crystal display, the present inventors focused on the fact that radicals generated from photoreactive functional groups in a photoalignment film dissolve into a liquid crystal layer and are ultimately ionized to decrease the VHR. Then, the present inventors found that when a polymer layer is formed between a photoalignment film and a liquid crystal layer, it makes it possible to reduce the region (area) where photoreactive functional groups in the photoalignment film are in direct contact with liquid crystal molecules in the liquid crystal layer, and to prevent transfer of radicals to the liquid crystal molecules.

The present inventors further examined a method for forming the polymer layer. According to a conventional polymer sustained alignment technique (hereinafter also referred to as a "PSA technique"), polymerizable monomers added to the liquid crystal layer are photopolymerized to form a polymer layer. Yet, in the case of photopolymerization, a photoreactive functional group in the photoalignment film may form radicals by absorbing long-wavelength light of 360 nm or more. Radicals may be generated from the photoalignment film during the polymer layer formation by photopolymerization, and transferred to liquid crystal molecules. Thus, the present inventors found a method for forming a polymer layer by dissolving monomers that can be thermally polymerized and polymerizing the monomers by heating the liquid crystal layer.

As a result of keen studies, the present inventors successfully solved the problems described above by adding a monomer having a specific epoxy group as a thermally polymerizable monomer and a curing agent containing an amino group, a hydrazide group, or an imidazole group (hereinafter also referred to as "amino group or the like") to a liquid crystal layer and thermally polymerizing these components so as to form a polymer layer between the liquid crystal layer and a photoalignment film. Thus, the present inventors arrived at the present invention.

Specifically, according to one aspect, the present invention may provide a liquid crystal display device including: paired substrates; a liquid crystal layer disposed between the substrates; a photoalignment film disposed between at least one of the substrates and the liquid crystal layer; and a polymer layer disposed between the photoalignment film and the liquid crystal layer, wherein the polymer layer has a structure derived from an epoxy-based monomer represented by the following formula (A) and a structure derived from a curing agent represented by the following formula (B):

[Chem. 2]

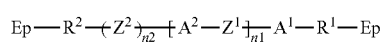

(A)

wherein Ep represents an epoxy group;

$R^1$ and $R^2$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$A^1$ and $A^2$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl group, or a C2-C18 unsaturated alkylene group;

—CH$_2$— groups of $A^1$ and $A^2$ are each optionally replaced by an —O— group or an —S— group as long as they are not adjacent to each other;

one or more hydrogen atoms of $A^1$ and $A^2$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

$Z^1$ represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$Z^2$ is a structure represented by the following formula (A-a);

n1 is 0, 1, 2, 3, 4, or 5; and n2 is 0 or 1,

[Chem. 3]

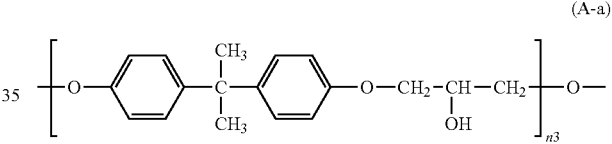

(A-a)

wherein n3 is an integer of 1 to 18,

[Chem. 4]

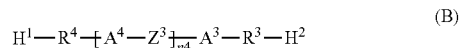

(B)

wherein $H^1$ and $H^2$ are the same as or different from each other and each represent an amino group, a dimethylamino group, a hydrazide group, or an imidazole group;

$R^3$ and $R^4$ are the same as or different from each other and each represent an —O— group, an —S— group, an —NH— group, a —CO— group, a —COO— group, an —OCO— group, an —NHCO— group, a —CONH— group, a —CH$_2$— group, a —C(CH$_3$)— group, a —C(CH$_3$)$_2$— group, a —CF$_2$— group, or a direct bond;

$A^3$ and $A^4$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl group, a C2-C18 unsaturated alkylene group, or a —CO— or —CO—CO— group;

—CH$_2$— groups of $A^3$ and $A^4$ are each optionally replaced by an —O— group, an —S— group, or an —NH— group as long they are not adjacent to each other;

one or more hydrogen atoms of $A^3$ and $A^4$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

$Z^3$ represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond; and n4 is 0, 1, 2, 3, 4, or 5.

According to another aspect, the present invention may provide a method for producing a liquid crystal display device, including: forming a photoalignment film on at least one of paired substrates; enclosing a liquid crystal composition containing a liquid crystal material, an epoxy-based monomer represented by the following formula (A), and a curing agent represented by the following formula (B) between the substrates on at least one of which a photoalignment film is formed, so as to form a liquid crystal layer; and thermally curing the epoxy-based monomer to form a polymer layer between the photoalignment film and the liquid crystal layer through a reaction between the epoxy-based monomer and the curing agent by heating the liquid crystal layer:

[Chem. 5]

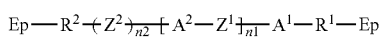
(A)

wherein Ep represents an epoxy group;

$R^1$ and $R^2$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$A^1$ and $A^2$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl group, or a C2-C18 unsaturated alkylene group;

—CH$_2$— groups of $A^1$ and $A^2$ are each optionally replaced by an —O— group or an —S— group as long as they are not adjacent to each other;

one or more hydrogen atoms of $A^1$ and $A^2$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

$Z^1$ represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$Z^2$ is a structure represented by the following formula (A-a);

n1 is 0, 1, 2, 3, 4, or 5; and n2 is 0 or 1,

[Chem. 6]

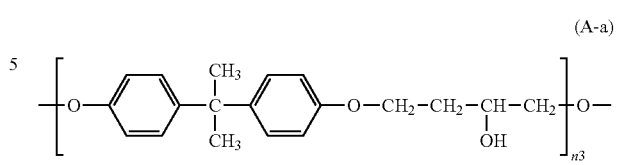
(A-a)

wherein n3 is an integer of 1 to 18,

[Chem. 7]

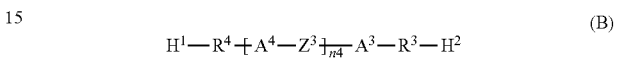
(B)

wherein $H^1$ and $H^2$ are the same as or different from each other and each represent an amino group, a dimethylamino group, a hydrazide group, or an imidazole group;

$R^3$ and $R^4$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$A^3$ and $A^4$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl group, a C2-C18 unsaturated alkylene group, or a —CO- or —CO—CO— group;

—CH$_2$— groups of $A^3$ and $A^4$ are each optionally replaced by an —O— group, an —S— group, or an —NH— group as long as they are not adjacent to each other;

one or more hydrogen atoms of $A^3$ and $A^4$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

$Z^3$ represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond; and n4 is 0, 1, 2, 3, 4, or 5.

Advantageous Effects of Invention

The liquid crystal display device of the present invention includes a photoalignment film, but a polymer layer is present between the liquid crystal layer and the photoalignment film. Thus, the liquid crystal display device can maintain a favorable voltage holding ratio and reduce or prevent image sticking, stains, and a decrease in contrast ratio for a long time not only in a room-temperature environment but also in a high-temperature environment.

The method for producing a liquid crystal display device according to the above aspect of the present invention includes forming a photoalignment film, but also includes thermally curing the epoxy-based monomer to form a polymer layer between the photoalignment film and the liquid crystal layer. Thus, it is possible to produce a liquid crystal display device capable of maintaining a favorable voltage holding ratio and reducing or preventing image sticking, stains, and a decrease in contrast ratio for a long time not only in a room-temperature environment but also in a high-temperature environment.

DESCRIPTION OF EMBODIMENTS

Embodiments of the present invention are described below. The present invention is not limited to the descriptions of the following embodiments, and design changes can be suitably made within the scope of the present invention.
<Liquid Crystal Display Device>

First, a liquid crystal display device according to Embodiment 1 is described with reference to FIG. 1.

Figure 1:
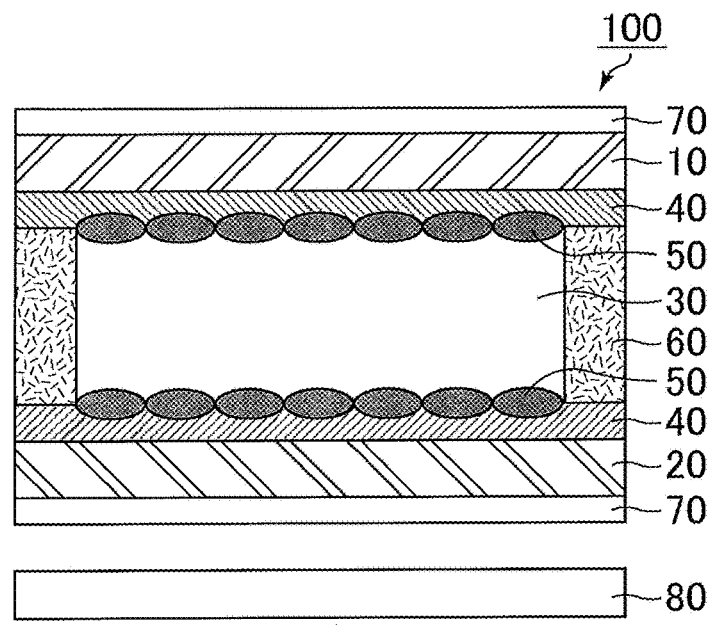
FIG. 1 shows a schematic cross-sectional view of a liquid crystal display device according to Embodiment 1.

FIG. 1 shows a schematic cross-sectional view of a liquid crystal display device according to Embodiment 1. As shown in FIG. 1, the liquid crystal display device according to this embodiment includes paired substrates 10 and 20; a liquid crystal layer 30 disposed between the substrates 10 and 20; photoalignment films 40 one of which is between the substrate 10 and the liquid crystal layer 30 and the other is between the substrate 20 and the liquid crystal layer 30; and polymer layers 50 on of which is between one photoalignment film 40 and the liquid crystal layer 30 and the other is between the other photoalignment film 40 and the liquid crystal layer 30. The liquid crystal display device may include only one photoalignment film 40 on one of the substrates 10 and 20. The liquid crystal display device according to this embodiment further includes a backlight 80 at the back of the paired substrates 10 and 20, and the substrates 10 and 20 are bonded to each other via a seal 60.

The liquid crystal display device according to this embodiment includes the polymer layers 50 of one which is between the liquid crystal layer 30 and one photoalignment film 40 and the other is between the liquid crystal layer 30 and the other photoalignment film 40. Thus, it is possible to reduce the region (area) where photoreactive functional groups in the photoalignment films 40 are in direct contact with liquid crystal molecules in the liquid crystal layer 30. Thus, even if radicals are generated from photoreactive functional groups in the photoalignment films 40 due to ultraviolet light or visible light emitted from the backlight 80, it is possible to prevent transfer of the radicals to the liquid crystal molecules. The same applies in a high-temperature environment. When the liquid crystal display device includes only one photoalignment film 40 on one of the substrates 10 and 20, for example, the other substrate may not be provided with an alignment film but may be provided with only a polymer layer disposed thereon, or may be provided with a rubbing-treated alignment film or a non-treated alignment film and a polymer layer disposed thereon.

Examples of the substrates 10 and 20 include a pair of an active matrix substrate (TFT substrate) and a color filter (CF) substrate.

The active matrix substrate may be one commonly used in the field of liquid crystal display devices. When the active matrix substrate is seen in a planar view, for example, the active matrix substrate has a structure which includes multiple parallel gate signal lines on a transparent substrate, multiple source signal lines extending in a direction perpendicular to the gate signal lines and formed in parallel to each other, active elements such as thin-film transistors (TFTs) arranged at positions corresponding to the intersections between the gate signal lines and the source signal lines, and pixel electrodes arranged in a matrix in regions partitioned by the gate signal lines and the source signal lines. In the case of a horizontal alignment mode, such a structure further includes components such as a common conductive line and a counter electrode connected to the common conductive line.

TFTs having a channel layer formed from amorphous silicon, polysilicon, or indium-gallium-zinc-oxide (IGZO; oxide semiconductor) are preferably used. The amount of off-leakage current is small particularly with oxide semiconductors. Thus, the oxide semiconductors are advantageous in low-frequency driving of liquid crystal display devices, but the low-frequency driving is not feasible when the VHR is low. According to this embodiment, it is possible to increase the VHR, thus enabling low-frequency driving. In other words, a combination of an oxide semiconductor and this embodiment is considered to be particularly preferred.

In the case of an active matrix display mode, usually, while the TFT disposed in each pixel is ON, a signal voltage is applied through the TFT to the electrode. While the TFT is OFF, the TFT holds the charge charged in each pixel. The voltage holding ratio (VHR) shows how much charged charge is held during one frame period (e.g., 16.7 ms). In other words, a low VHR means that the voltage applied to the liquid crystal layer is likely to attenuate with time, and a high VHR is required in the active matrix display mode.

The color filter substrate may be one that is commonly used in the field of liquid crystal display devices. The structure of the color filter substrate includes, for example, a black matrix in a grid pattern and color filters each formed within a cell of the grid (i.e., pixels) formed on a transparent substrate.

The color filters and the active matrix may both be formed on one of the substrates 10 and 20.

The liquid crystal layer 30 is not particularly limited as long as it is a layer containing at least one type of liquid crystal materials, usually a thermotropic liquid crystal, preferably a liquid crystal material (nematic liquid crystal) that exhibits the nematic phase. The liquid crystal material is preferably one that undergoes a phase transition from the nematic phase to the isotropic phase at a given critical temperature (nematic-isotropic phase transition temperature) or higher when heated from the nematic phase. The liquid crystal layer 40 preferably exhibits the nematic phase in a usage environment of the liquid crystal display device (e.g., −40° C. to 90° C.)

The anisotropy of dielectric constant ($\Delta\varepsilon$) of the liquid crystal material, which is defined by a formula shown below, may be negative or positive. In other words, the liquid crystal molecules may have negative anisotropy of dielectric constant or positive anisotropy of dielectric constant. As the liquid crystal molecules having a negative anisotropy of dielectric constant, for example, those having $\Delta\varepsilon$ of −1 to −20 can be used. As the liquid crystal molecules having a positive anisotropy of dielectric constant, for example, those having $\Delta\varepsilon$ of 1 to 20 can be used. The liquid crystal layer 30 may further contain non-polar liquid crystal molecules (neutral liquid crystal molecules) in which Δε is substantially 0. Examples of the neutral liquid crystal molecules include liquid crystal molecules having an alkene structure.

Δε=(Dielectric constant in major axis direction)−
(Dielectric constant in minor axis direction)

In the case of conventional liquid crystal display devices, defects such as image sticking and stains tend to be more visible when liquid crystal molecules having negative dielectric anisotropy are used than when liquid crystal molecules having positive anisotropy of dielectric constant are used. Examination of the cause reveals that generally, when radicals are generated in a high molecular compound used as a component of an alignment film, some of the radicals are easily transferred to negative liquid crystal molecules and/or neutral liquid crystal molecules (non-polar liquid crystal molecules) having an alkene structure in the liquid crystal layer, likely decreasing the VHR. Thus, in a photoalignment liquid crystal display, presumably, a decrease in VHR occurs as radicals generated from photoreactive functional groups in a photoalignment film are transferred to liquid crystal materials (particularly, a negative liquid crystal material) and ultimately ionized. Since liquid crystal molecules having negative dielectric anisotropy are strongly polarized in the minor axis direction, such liquid crystal molecules presumably have a higher impact on the extent of the decrease in VHR after radicals are ionized. In other words, the liquid crystal display device according to this embodiment exhibits a higher effect when a liquid crystal material having negative dielectric anisotropy is used than when a liquid crystal material having positive dielectric anisotropy is used.

The photoalignment films 40 are alignment films that have been subjected to a photoalignment treatment by light irradiation. The photoalignment films 40 have a function to control the alignment of the liquid crystal molecules in the liquid crystal layer 30. When the voltage applied to the liquid crystal layer 30 is lower than the threshold voltage (including no voltage application), the alignment of the liquid crystal molecules in the liquid crystal layer 30 is controlled mainly by the function of the photoalignment films 40. An angle formed by the major axis of the liquid crystal molecules with respect to the surfaces of the substrates 10 and 20 in this state (hereinafter also referred to as an "initial alignment state") is referred to as a "pre-tilt angle". The term "pre-tilt angle" as used herein indicates the angle of tilt of the liquid crystal molecules from the direction parallel to the substrate surface. The angle parallel to the substrate surface is 0°, and the angle normal to the substrate surface is 90°.

The degree of the pre-tilt angle of the liquid crystal molecules imparted by the photoalignment films 40 is not particularly limited. The photoalignment films 40 may substantially horizontally align the liquid crystal molecules in the liquid crystal layer 30 (i.e., a horizontal alignment film) or substantially vertically align the liquid crystal molecules in the liquid crystal layer 30 (i.e., a vertical alignment film). In the case of the horizontal alignment film, when the liquid crystal molecules are substantially horizontally aligned, the pre-tilt angle is preferably substantially 0° (e.g., less than 10°). The pre-tilt angle is more preferably 0° in order to achieve an effect to maintain favorable contrast characteristics for a long time. When the display mode is an IPS mode or an FFS mode, the pre-tilt angle is preferably 0° also in terms of viewing angle characteristics. When the display mode is a TN mode, the pre-tilt angle is set to, for example, about 2° due to restrictions associated with the mode. In the case of the vertical alignment film, when the liquid crystal molecules are substantially vertically aligned, the pre-tilt angle is preferably 83.0° or more. The pre-tilt angle is more preferably 88.0° or more in terms of viewing angle characteristics, response characteristics, dark line thickness (which affects the transmittance) in four-domain division alignment, and alignment stability. A pre-tilt angle of 83.0° or more is suitable to the display mode that employs a voltage-applied PSA (PSA using a photoalignment film) technique (in this mode, the pre-tilt angle may be set to 85° or less).

The photoalignment films 40 preferably contain a photoreactive functional group-containing polymer (hereinafter also referred to as a "photoreactive group-containing polymer). The term "photoreactive functional group" refers to a functional group whose structure can change when it is irradiated with light (e.g., ultraviolet light and visible light) (electromagnetic waves). Examples of structural changes in photoreactive functional groups include dimerization (dimer formation), isomerization, photo Fries rearrangement, and decomposition. The structural change in photoreactive functional groups allows the photoalignment films 40 to exhibit alignment-controlling force, or change the level and/or orientation of the alignment-controlling force of the photoalignment films 40. The alignment-controlling force means an ability to control the alignment of liquid crystal molecules in the vicinity of the alignment film.

Since the photoalignment films 40 contain photoreactive functional groups, an alignment treatment (photoalignment treatment) can be performed on the photoalignment films 40 by light irradiation. The photoalignment treatment is a dustless, highly reliable method of aligning liquid crystal with excellent in-plane uniformity. In addition, since the alignment treatment is directly performed on the photoalignment films 40, alignment-controlling means (e.g., protrusions or structures) are no longer necessary, thus eliminating factors that may reduce the transmittance. Therefore, a high transmittance can be achieved.

Specific examples of the photoreactive functional groups include an azobenzene group, a chalcone group, a cinnamate group, a coumarin group, a tolan group, and a stilbene group. Among photoreactive functional groups, those that absorb light in the wavelength region of 360 nm or more may be decomposed into radicals by light emitted during the photoalignment treatment or light from the backlight 80 during use of the liquid crystal display device. Since the liquid crystal display device according to this embodiment includes the polymer layers 50 one of which is between the liquid crystal layer 30 and one photoalignment film 40 and the other is between the liquid crystal layer 30 and the other photoalignment film 40, even if radicals are generated from the photoalignment films 40 by light irradiation, it is possible to prevent the radicals from dissolving into the liquid crystal layer 30. Examples of photoreactive functional groups that absorb light in the wavelength region of 360 nm or more include an azobenzene group, a chalcone group, and a cinnamate group. When the photoreactive functional group is an azobenzene group, a chalcone group, or a cinnamate group, the liquid crystal display device according to this embodiment can markedly exhibit the effect of preventing radicals from dissolving into the liquid crystal layer 30.

Examples of specific structures of the photoreactive functional groups include a trans-isomer of azobenzene represented by the following formula (C-1-1), a cis-isomer of azobenzene represented by the following formula (C-1-2), 4-chalcone represented by the following formula (C-2-1), 4'-chalcone represented by the following formula (C-2-2), and a cinnamate group represented by the following formula (C-3).

[Chem. 8]

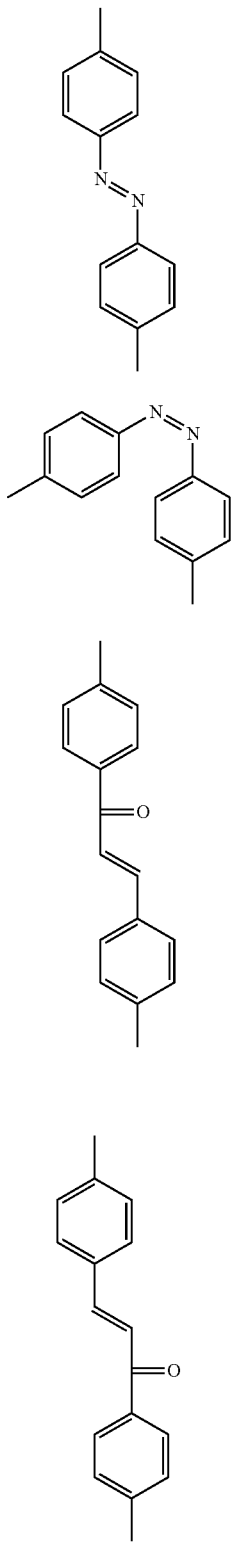

(C-1-1)

(C-1-2)

(C-2-1)

(C-2-2)

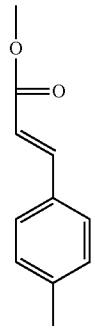

(C-3)

The photoalignment films 40 preferably contain a polymer containing a carboxyl group. The photoreactive functional group-containing polymer and the polymer containing a carboxyl group may be individual polymers; or the photoreactive functional group-containing polymer may further contain a carboxyl group. It is more preferred that the carboxyl group and the epoxy-based monomer are bonded to each other. The bond is preferably formed by thermal polymerization by heating. Since an epoxy group can also react with a carboxyl group, heating the liquid crystal layer 30 allows a carboxyl group in the polymer containing a carboxyl group and/or the photoreactive functional group-containing polymer in the photoalignment films 40 to thermally react with and bind to an epoxy group in an epoxy-based monomer constituting each polymer layer 50. Thus, chemical bonds can be formed between the photoalignment films 40 and the polymer layers 50, significantly lowering the possibility of partial dissolution of the polymer constituting the polymer layers 50 into the liquid crystal layer 30. This makes it possible to more effectively reduce or prevent a decrease in VHR and contrast ratio.

The photoalignment films 40 preferably contain a polymer containing an epoxy group. The photoreactive functional group-containing polymer and the polymer containing an epoxy group may be individual polymers; or the photoreactive functional group-containing polymer may further contain an epoxy group. It is more preferred that the epoxy group and the curing agent are bonded to each other. The bond is preferably formed by thermal polymerization by heating. Heating the liquid crystal layer 30 allows an epoxy group in the polymer containing an epoxy group and/or the photoreactive functional group-containing polymer in the photoalignment films 40 to thermally react with and bind to an amino group or the like constituting each polymer layer 50. Thus, chemical bonds can be formed between the photoalignment films 40 and the polymer layers 50, significantly lowering the possibility of partial dissolution of the polymer constituting the polymer layers 50 into the liquid crystal layer 30. This makes it possible to more effectively reduce or prevent a decrease in VHR and contrast ratio.

Patent Literature 1 nowhere discloses such a combination of a monomer constituting the polymer layers 50 and a monomer constituting the alignment films.

The photoalignment films 40 preferably contain a polymer selected from the group consisting of a polyamic acid, a polyimide, a polysiloxane, a polyvinyl, and polymaleimide. These polymers can increase the weight average molecular weight at the polymer synthesis stage. Thus, the presence of these polymers in the photoalignment films enables a further reduction in image sticking (decrease in VHR and generation of residual DC voltage) resulting from impurities due to dissolution of a low molecular weight component into the liquid crystal layer during use of the liquid crystal display device.

The photoalignment films 40 may contain the photoreactive functional group-containing polymer, a polymer containing a carboxyl group, a polymer containing an epoxy group, and the polymer selected from the group consisting of a polyamic acid, a polyimide, a polysiloxane, a polyvinyl, and polymaleimide, as individual polymers; or may contain a polymer containing these polymers in an appropriate combination. For example, the photoalignment films 40 may contain a polymer whose main chain is selected from the group consisting of a polyamic acid, a polyimide, a polysiloxane, a polyvinyl, and polymaleimide, which further contains a photoreactive functional group and a carboxyl group and/or an epoxy group on the main chain. The photoalignment films 40 may contain a polymer whose main chain is selected from the group consisting of a polyamic acid, a polyimide, a polysiloxane, a polyvinyl, and polymaleimide, which further contains a carboxyl group and/or an epoxy group on the main chain and a photoreactive functional group on the side chain. The photoalignment films 40 may contain a polymer whose main chain is selected from the group consisting of a polyamic acid, a polyimide, a polysiloxane, a polyvinyl, and polymaleimide, which further contains a photoreactive functional group and a carboxyl group and/or an epoxy group on the side chain(s).

The polyamic acid may contain a repeating structural unit represented by the following formula (D), for example. The polyamic acid contains a carboxyl group in the molecule. Thus, in view of the fact that the photoalignment films 40 preferably contain a polymer containing a carboxyl group, the photoalignment films 40 preferably contain a polyamic acid.

[Chem. 9]

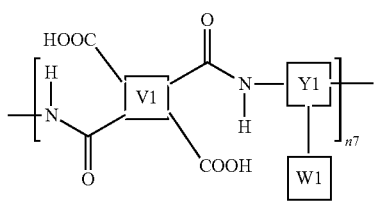

(D)

wherein n7 represents a polymerization degree and is an integer of 1 or more.

Specific examples of the V1 include structures represented by the following formulas (E-1) to (E-12). At least one hydrogen atom contained in each structure is optionally replaced by a fluorine group, a methyl group, an ethyl group, or an isopropyl group.

[Chem. 10]

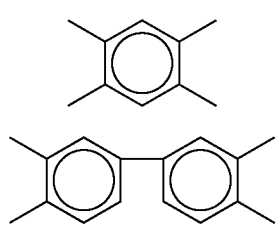

(E-1)

(E-2)

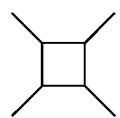

(E-3)

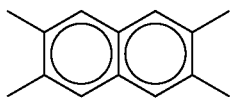

(E-4)

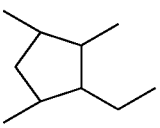

(E-5)

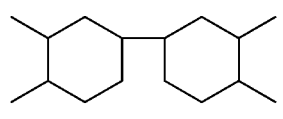

(E-6)

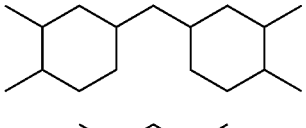

(E-7)

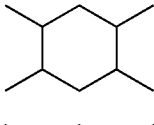

(E-8)

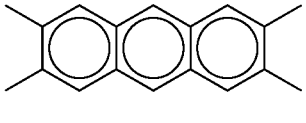

(E-9)

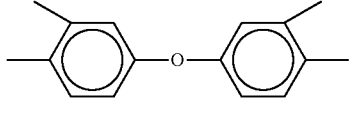

(E-10)

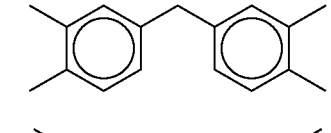

(E-11)

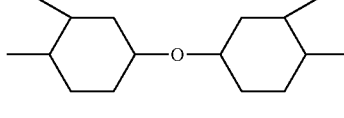

(E-12)

When the V1 is a photoreactive structure, examples thereof include structures represented by the following formulas (F-1) to (F-4).

[Chem. 11]

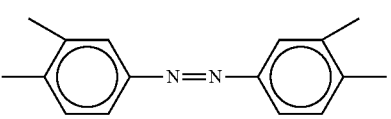

(F-1)

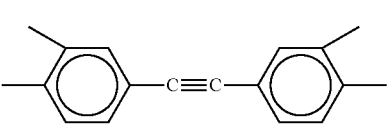

(F-2)

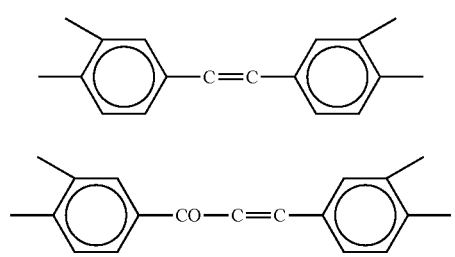
(F-3)

(F-4)

Specific examples of the Y1 include structures represented by the following formulas (G-1) to (G-16). At least one hydrogen atom contained in each structure is optionally replaced by a fluorine group, a methyl group, an ethyl group, or an isopropyl group.

[Chem. 12]

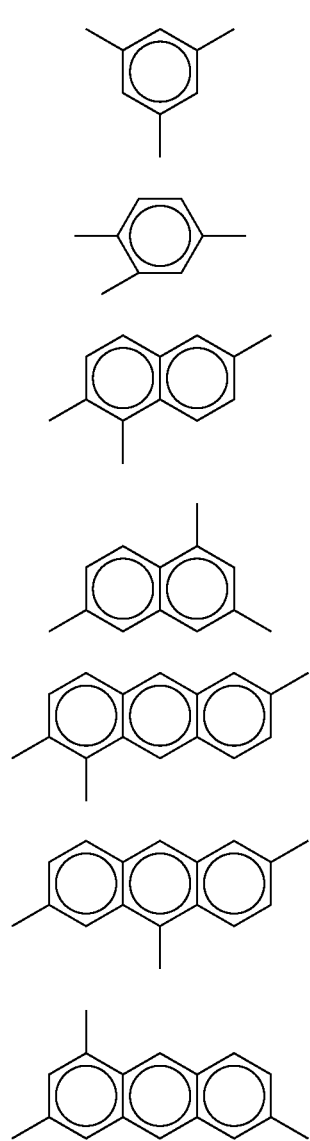

(G-1)
(G-2)
(G-3)
(G-4)
(G-5)
(G-6)
(G-7)

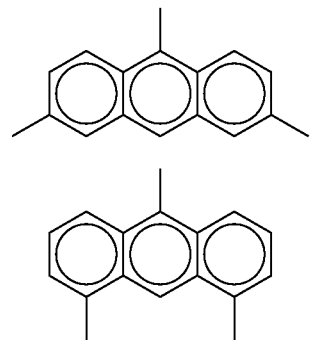
(G-8)
(G-9)

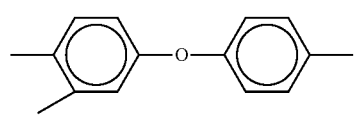
(G-10)

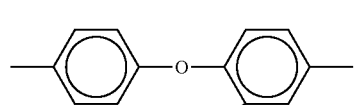
(G-11)

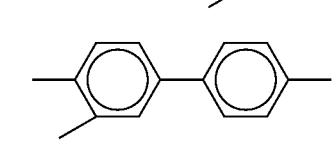
(G-12)
(G-13)

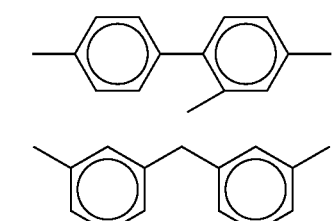
(G-14)
(G-15)

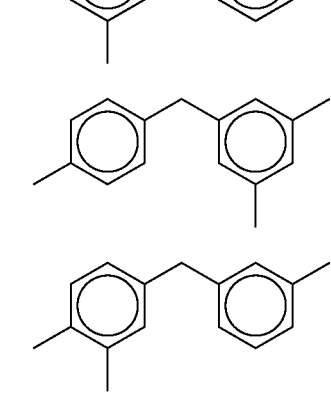
(G-16)

When the Y1 is a photoreactive structure, examples thereof include structures represented by the following formulas (H-1) to (H-8).

[Chem. 13]

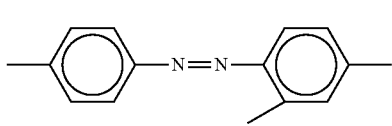
(H-1)

-continued

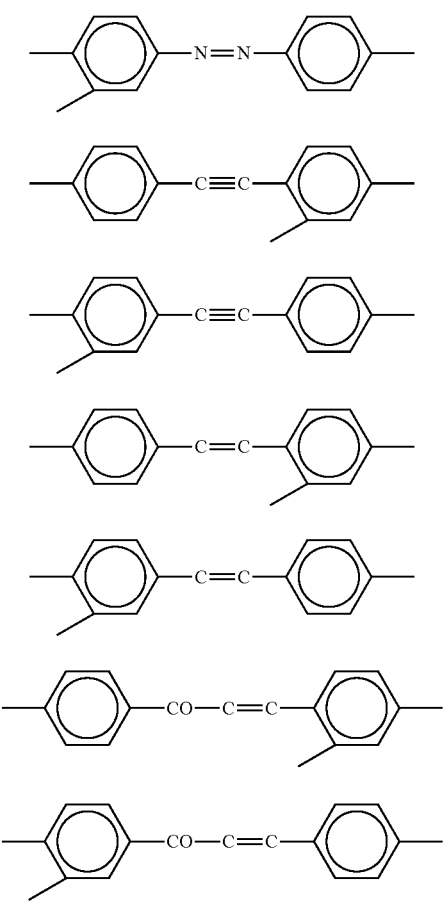

The W1 represents a side chain. The W1 may not be introduced into some or all of the repeating structural units represented by the formula (D).

When the photoalignment films 40 are horizontal alignment films, a functional group that can substantially horizontally align liquid crystal molecules without light irradiation (hereinafter also referred to as a "horizontal alignment functional group") as the W1 may be separately introduced into at least one of the repeating structural units represented by the formula (D).

Specific examples of the horizontal alignment functional group include structures represented by the following formulas (I-1) to (I-8).

[Chem. 14]

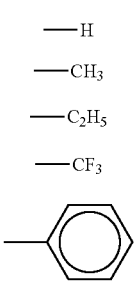

-continued

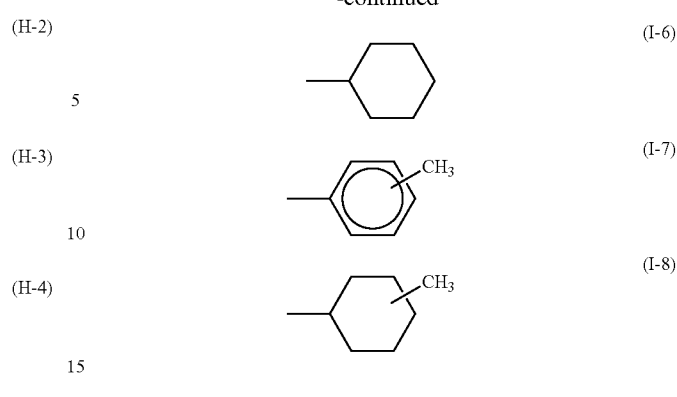

When the photoalignment films 40 are vertical alignment films, a functional group that can substantially vertically align liquid crystal molecules without light irradiation (hereinafter also referred to as a "vertical alignment functional group") as the W1 may be separately introduced into at least one of the repeating structural units represented by the formula (D).

Specific examples of the vertical alignment functional group include structures represented by the following formulas (J-1) to (J-7):

[Chem. 15]

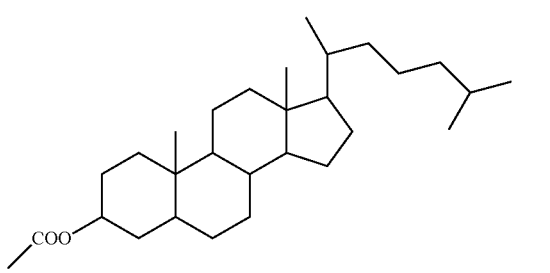

(J-1)

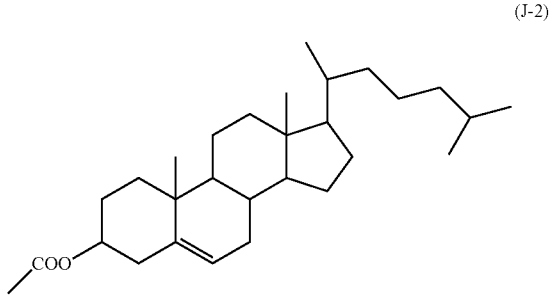

(J-2)

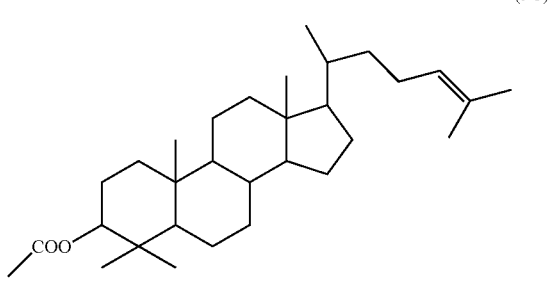

(J-3)

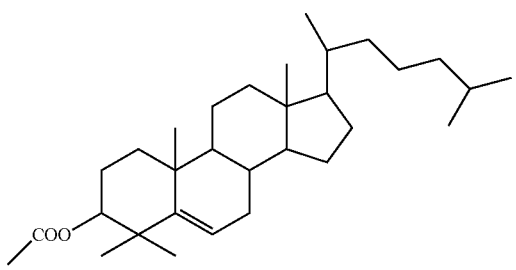 (J-4)

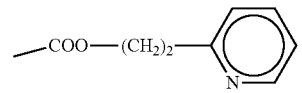 (J-5)

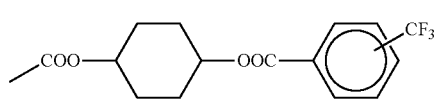 (J-6)

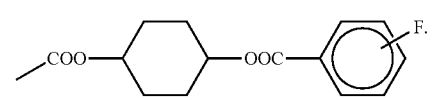 (J-7)

In the formula (D), at least one of the V1, Y1, and W1 contains a photoreactive functional group. However, in the polyamic acid in one molecule, it is not necessary that all the repeating structural units contain photoreactive functional groups. It suffices as long as at least one repeating structural unit contains photoreactive functional groups. In addition, the polyamic acid may consist of repeating structural units containing one type of photoreactive functional groups, or a repeating structural unit containing a different type of photoreactive functional groups may also be present in one molecule. Further, a polyamic acid containing one type of photoreactive functional groups and a polyamic acid containing a different type of photoreactive functional groups may be mixed together.

The polyamic acid may be partially imidized. The initial chemical imidization rate of the polyamic acid is preferably 0% or higher and 50% or lower. In view of the fact that the photoalignment films 40 preferably contain a polymer containing a carboxyl group, it is preferred that the polyamic acid has a lower initial chemical imidization rate. The upper limit of the initial chemical imidization rate of the polyamic acid is more preferably 40%. The polyamic acid can be imidized by thermal or catalytic dehydration ring closure.

When a side chain is introduced into some of the repeating structural units and is not introduced into other structural units, the arrangement of these structural units is not particularly limited. For example, structural units containing a side chain and structural units not containing side chains may be arranged alternately or randomly, or multiple structural units may be arranged sequentially as a block unit.

When the photoreactive group-containing polymer is a polyamic acid, the weight average molecular weight is preferably 2,500 or more, and is preferably 1,000,000 or less. When the weight average molecular weight is more than 1,000,000, the viscosity of the liquid crystal alignment agent may be too high to form the photoalignment films 40. The weight average molecular weight can be determined by gel permeation chromatography (GPC).

The polyimide may be one in which a polyamic acid containing a repeating structural unit represented by the formula (D) is ring-closed (imidized) by thermal or catalytic dehydration. It is preferred that the repeating structural unit represented by the formula (D) is entirely imidized, but may include a non-imidized portion. The polyimide preferably has an initial chemical imidization rate higher than 50%.

When the photoreactive group-containing polymer is a polyimide, the weight average molecular weight is preferably 2,500 or more and is preferably 1,000,000 or less. If the weight average molecular weight is more than 1,000,000, the viscosity of the liquid crystal alignment agent may be too high to form the photoalignment films 40.

The polysiloxane may contain a repeating structural unit represented by the following formula (K), for example:

[Chem. 16]

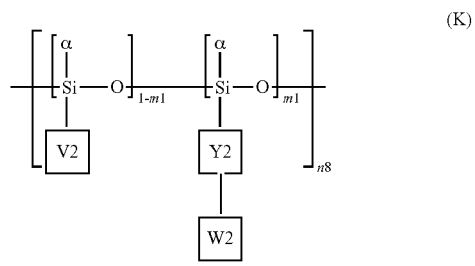 (K)

wherein α represents an —H group, an —OH group, a methoxy group, or an ethoxy group; m1 is a real number in the range of 0<m≤0.5; and n8 represents a polymerization degree and is an integer of 1 or more.

V2 represents a side chain containing a photoreactive functional group. Examples of the photoreactive functional group include an azobenzene group, a chalcone group, and a cinnamate group.

In at least one of the repeating structural units represented by the formula (K), a horizontal alignment functional group or a vertical alignment functional group may be separately inserted into V2. Specific examples of the horizontal alignment functional group include structures represented by the formulas (I-1) to (I-8), and specific examples of the vertical alignment functional group include structures represented by the formulas (J-1) to (J-7).

The Y2 represents a C1-C6 saturated or unsaturated alkylene group or a C1-C6 alkyleneoxy group.

The W2 is preferably an epoxy group. In view of the fact that the photoalignment films 40 preferably contain a polymer containing an epoxy group, the photoalignment films 40 preferably contain a polysiloxane in which the W2 is an epoxy group.

More specific examples of the repeating structural unit represented by the formula (K) include a repeating structural unit represented by the following formula (K-1) or (K-2).

[Chem. 17]

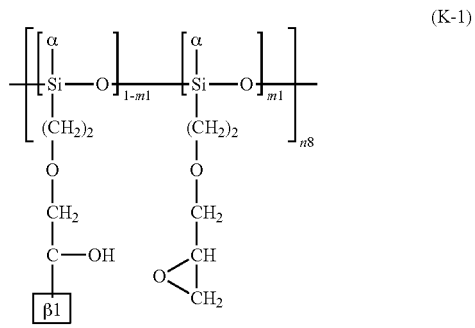 (K-1)

[Chem. 18]

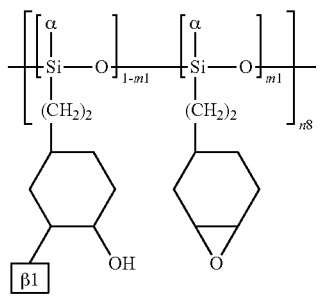
(K-2)

β1 represents a structure containing a cinnamate group represented by the following formula (L-1) or (L-2):

[Chem. 19]

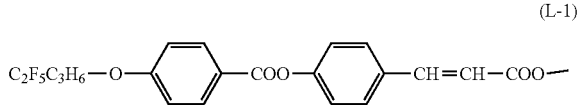
(L-1)

[Chem. 20]

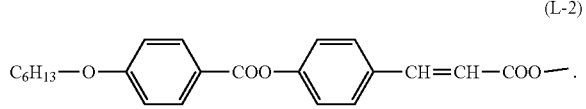
(L-2)

In the polysiloxane in one molecule, it is not necessary that all the repeating structural units contain photoreactive functional groups. It suffices as long as at least some repeating structural units contain photoreactive functional groups. In addition, the polysiloxane may consist of repeating structural units containing one type of photoreactive functional groups, or a repeating structural unit containing a different type of photoreactive functional groups may also be present in one molecule. Further, a polysiloxane containing one type of photoreactive functional groups and a polysiloxane containing a different type of photoreactive functional groups may be mixed together.

In the repeating structural units, the arrangement of the units containing V2 and the units containing Y2 is not particularly limited. For example, the units containing V2 and the units containing Y2 may be arranged alternately or randomly, or multiple units may be arranged sequentially as a block unit.

When the photoreactive group-containing polymer is a polysiloxane, the weight average molecular weight is preferably 2,500 or more and is preferably 1,000,000 or less. If the weight average molecular weight is more than 1,000,000, the viscosity of the liquid crystal alignment agent may be too high to form the photoalignment films 40.

The polyvinyl may include a repeating structural unit represented by the following formula (M):

[Chem. 21]

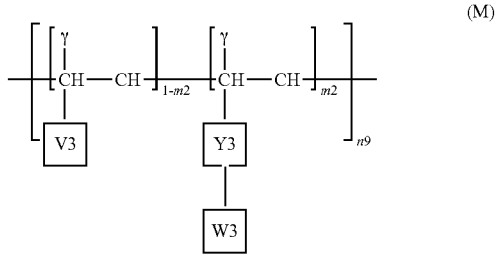
(M)

wherein γ represents an —H group, a —CH$_3$ group, or a —C$_2$H$_5$ group; m2 is a real number in the range of 0<m2≤0.5; and n9 represents a polymerization degree and is an integer of 1 or more.

V3 represents a side chain containing a photoreactive functional group. Examples of the photoreactive functional group include an azobenzene group, a chalcone group, and a cinnamate group.

The Y3 represents a C1-C6 saturated or unsaturated alkylene or alkyleneoxy group, an ethylene glycol group having 1 to 6 repeating units, or a direct bond.

The W3 is preferably a carboxyl group. In view of the fact that the photoalignment films 40 preferably contain a polymer containing a carboxyl group, the photoalignment films 40 preferably contain a polyvinyl in which the W3 is a carboxyl group.

In at least one of the repeating structural units represented by the formula (M), a horizontal alignment functional group or a vertical alignment functional group may be separately inserted into V3. Specific examples of the horizontal alignment functional group include structures represented by the formulas (I-1) to (I-8), and specific examples of the vertical alignment functional group include structures represented by the formulas (J-1) to (J-7).

More specific examples of the repeating structural unit represented by the formula (M) include a repeating structural unit represented by the following formula (M-1). β1 represents a structure containing a cinnamate group represented by the formula (L-1) or (L-2).

[Chem. 22]

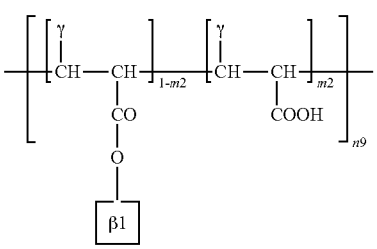
(M-1)

In the polyvinyl in one molecule, it is not necessary that all the repeating structural units contain photoreactive functional groups. It suffices as long as at least some repeating structural units contain photoreactive functional groups. In addition, the polyvinyl may consist of repeating structural units containing one type of photoreactive functional groups, or a repeating structural unit containing a different type of photoreactive functional groups may also be present in one molecule. Further, a polyvinyl containing one type of photoreactive functional groups and a polyvinyl containing a different type of photoreactive functional groups may be mixed together.

In the repeating structural units, the arrangement of the units containing V3 and the units containing Y3 is not particularly limited. For example, the units containing V3 and the units containing Y3 may be arranged alternately or randomly, or multiple units may be arranged sequentially as a block unit.

When the photoreactive group-containing polymer is a polyvinyl, the weight average molecular weight is preferably 2,500 or more and is preferably 1,000,000 or less. If the weight average molecular weight is more than 1,000,000, the viscosity of the liquid crystal alignment agent may be too high to form the photoalignment films 40.

The photoalignment films 40 may further contain other components in addition to the photoreactive group-containing polymer. Examples of the other components include polymers other than the above-described photoreactive group-containing polymer, curing agents, curing accelerators, and catalysts. The polymers other than the above-described photoreactive group-containing polymer can be used to improve the dissolution characteristics of the liquid crystal alignment agent and the electrical characteristics of the alignment films. Examples of such polymers include general alignment film polymers that do not contain photoreactive functional groups.

The thickness of the photoalignment films 40 is not particularly limited, but it is preferably 1 nm or more, more preferably 3 nm or more, still more preferably 5 nm or more, particularly preferably 8 nm or more. The thickness of the photoalignment films 40 is preferably 300 nm or less, more preferably 150 nm or less, still more preferably 120 nm or less, particularly preferably 100 nm or less. Generally, radical transfer is less likely to occur when the transfer distance is greater, and the probability of radical transfer is lower when the photoalignment films are thinner because the absolute total amount of photoreactive functional groups is smaller in thinner photoalignment films. Thus, in order to effectively prevent radical transfer to the liquid crystal molecules, the photoalignment films 40 are preferably as thin as possible.

The polymer layers 50 each include a structure derived from an epoxy-based monomer represented by the following formula (A), and a structure derived from a curing agent represented by the following formula (B):

[Chem. 23]

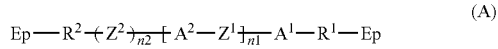

(A)

wherein Ep represents an epoxy group;

$R^1$ and $R^2$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$A^1$ and $A^2$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl group, or a C2-C18 unsaturated alkylene group;

—CH$_2$— groups of $A^1$ and $A^2$ are each optionally replaced by an —O— group or an —S— group as long as they are not adjacent to each other;

one or more hydrogen atoms of $A^1$ and $A^2$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

$Z^1$ represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$Z^2$ is a structure represented by the following formula (A-a);

n1 is 0, 1, 2, 3, 4, or 5; and n2 is 0 or 1,

[Chem. 24]

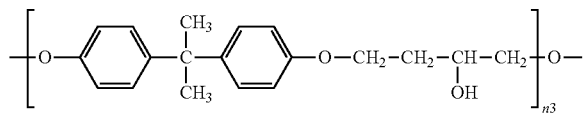

(A-a)

wherein n3 is an integer of 1 to 18.

The epoxy group is a structure represented by the following formula (A-b). In the formula (A), when n1 is 2 or more, $A^2$ and $Z^1$ in the repeating unit may be the same as or different from each other in each repeating unit.

[Chem. 25]

(A-b)

[Chem. 26]

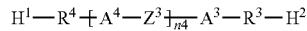

(B)

wherein $H^1$ and $H^2$ are the same as or different from each other and each represent an amino group, a dimethylamino group, a hydrazide group, or an imidazole group;

$R^3$ and $R^4$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$A^3$ and $A^4$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl group, a C2-C18 unsaturated alkylene group, a —CO— group, or a —CO—CO— group;

—CH$_2$— groups of $A^3$ and $A^4$ are each optionally replaced by an —O— group, an —S— group, or an —NH— group as long as they are not adjacent to each other;

one or more hydrogen atoms of $A^3$ and $A^4$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

$Z^3$ represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond; and n4 is 0, 1, 2, 3, 4, or 5.

In the formula (B), when n2 is 2 or more, $A^4$ and $Z^2$ in the repeating unit may be the same as or different from each other in each repeating unit.

The epoxy-based monomer represented by the formula (A) contains an epoxy group, and the curing agent represented by the formula (B) contains an amino group, a hydrazide group, or an imidazole group. Adding the epoxy-based monomer and the curing agent in addition to the liquid crystal material to the liquid crystal layer 30 allows an epoxy group in the epoxy-based monomer to react with an amino group or the like in the curing agent to form a polymer when the liquid crystal layer 30 is heated. Generally, the "liquid crystal molecules" are stabilized in an arrangement (alignment) state and the liquid crystal molecules in an arrangement state are considered to be making translational motion. In contrast, the polymer tends to assume a random coil conformation, and is considered to mainly make rotary motion. It is difficult for a rotary polymer to stay in the liquid crystal molecules that mainly make translational motion in view of the thermal energy. Thus, an increase in the molecular weight causes phase-separation of the polymer from the liquid crystal molecules, and the polymer will be mostly present at the boundary between the liquid crystal layer 30 and each photoalignment film 40. As the polymer is phase-separated from the liquid crystal layer 30 as described above, the polymer layer 50 can be formed between the liquid crystal layer 30 and each photoalignment film 40. It should be noted that since the phase-separation of the polymer is caused by an increase in the molecular weight of the polymer, the polymer layer 50 can be formed between the liquid crystal layer 30 and each photoalignment film 40 even when the photoalignment films 40 do not contain a polymer containing a carboxyl group and/or a polymer containing an epoxy group.

In this embodiment, since the polymer layers 50 can be formed by thermal polymerization between the epoxy-based monomer and the curing agent, it is unnecessary to irradiate the liquid crystal layer 30 with light when forming the polymer layers 50. Thus, it is possible to suppress generation of radicals from the photoalignment films 40 when forming the polymer layers 50. In contrast, with the conventional PSA technique in which polymer layers are formed by photopolymerization of monomers, radicals are generated from photoreactive functional groups (particularly photoreactive functional groups that absorb light in the wavelength range of 360 nm or more) when forming a polymer layer, and the radicals may be transferred to liquid crystal molecules, decreasing the VHR.

In order to polymerize monomers containing an epoxy group, it is essential to introduce an ionic polymerization initiator (such as a cationic or anionic polymerization initiator) or a curing agent (such as an amine or a hydrazide). In this embodiment, in order to polymerize epoxy-based monomers, a diamine-based compound, a dihydrazide-based compound, or an imidazole-based compound is dissolved as a thermal curing agent in the liquid crystal material. Patent Literature 1 describes a monomer containing an epoxy group as a polymerizable group, but nowhere discloses introduction of an ionic polymerization initiator or a curing agent, and it is impossible to polymerize epoxy-based monomers without introduction of an ionic polymerization initiator or a curing agent. In addition, in this embodiment, the monomer layers 50 are formed by a polymer layer formation process based on thermal polymerization, which is different from a monomer layer formation process based on photopolymerization disclosed in Patent Literature 1. Moreover, this embodiment is suitable for liquid crystal display devices including photoalignment films, preferably liquid crystal display devices including photoalignment films containing photoreactive functional groups that absorb light having a wavelength of 360 nm or more, whereas Patent Literature 1 is completely silent about the use of photoalignment films as alignment films.

The epoxy-based monomer contains two epoxy groups in one molecule, and the curing agent contains two amino groups or the like in one molecule. Thus, heating the epoxy-based monomer and the curing agent can cause a reaction between one of the epoxy groups in the epoxy-based monomer and one of the amino groups or the like in the curing agent, thus forming a polymer. The other epoxy group in the epoxy-based monomer and the other amino group or the like in the curing agent can also each bind to functional groups in the photoalignment films 40, and can thus be incorporated into the polymer layers 50, preventing unreacted epoxy-based monomer and curing agent from remaining in the liquid crystal layer 30.

As described above, the liquid crystal display device according to this embodiment includes the photoalignment films 40, but can prevent transfer of radicals to the liquid crystal molecules because the liquid crystal display device includes the polymer layers 50 having a structure derived from the epoxy-based monomer and a structure derived from the curing agent between the liquid crystal layer 30 and each photoalignment film 40. As a result, it is possible to maintain a favorable voltage holding ratio and reduce or prevent image sticking, stains, and a decrease in contrast ratio for a long time not only in a room-temperature environment but also in a high-temperature environment. In order to reduce the region (area) where the photoreactive functional groups in the photoalignment films 40 and the liquid crystal molecules in the liquid crystal layer 30 are in direct contact with each other, the polymer layer 50 is preferably formed over the entire surface between the liquid crystal layer 30 and one of the photoalignment films 40 and between the liquid crystal layer 30 and the other photoalignment film 40. Yet, it suffices as long as the polymer layer 50 is formed between at least a portion between the liquid crystal layer 30 and the photoalignment film 40. There may be a region where the polymer layer 50 is not formed between the liquid crystal layer 30 and the photoalignment film 40. The "room temperature" is a usual operating temperature of a liquid crystal display device. For example, it is 5° C. to 35° C. The "high temperature" is, for example, 50° C. to 110° C.

The polymer layers 50 are formed using the PSA technique. The PSA technique is a technique in which a liquid crystal composition containing a polymerizable monomer is enclosed in between the substrates, the polymerizable monomer is polymerized to form a polymer on the surface of each alignment film, and the initial alignment state of the liquid crystal molecules is fixed by the polymer. Thus, in addition to the effects described above, the polymer layers 50 can also fix the initial alignment state of the liquid crystal molecules in the liquid crystal layer 30.

An epoxy-based monomer represented by the formula (A) contains two epoxy groups in one molecule. Examples of the monomer containing two epoxy groups in one molecule include bisphenol A epoxy-based monomer, bisphenol F epoxy-based monomer, novolack epoxy-based monomer, and cycloaliphatic epoxy monomer.

Specific examples of the epoxy-based monomer represented by the formula (A) include monomers represented by the following formulas (A-1) to (A-8). In the formula (A-2) below, n3 is an integer of 1 to 18. In the formula (A-8) below, n5 is an integer of 1 to 6. In the formula (A-6) below, $R^4$ is an —H group or a —$CH_3$ group. Monomers represented by the formulas (A-1) and (A-2) below are specific examples of the bisphenol A epoxy-based monomer. A monomer represented by the formula (A-7) below is a specific example of the novolack epoxy-based monomer. Monomers represented by the following formulas (A-6) and (A-8) are specific examples of the cycloaliphatic epoxy monomer. A monomer represented by the following formula (A-7) is a specific example of the bisphenol F epoxy-based monomer.

phenylenediamine. A monomer represented by the following formula (B-18) is a specific example of the diaminodiphenylmethane. A monomer represented by the following formula (B-19) is a specific example of the diaminodiphenylsulfone.

[Chem. 28]

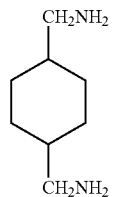

(B-1)

[Chem. 27]

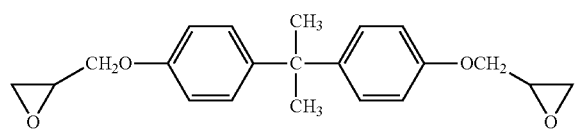

(A-1)

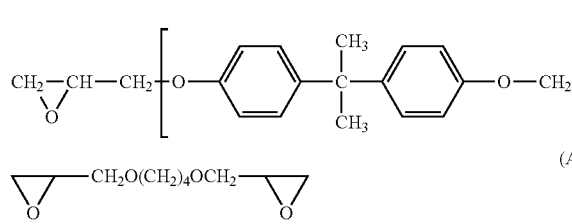

(A-2)

(A-3)

(A-4)

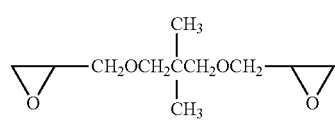

(A-5)

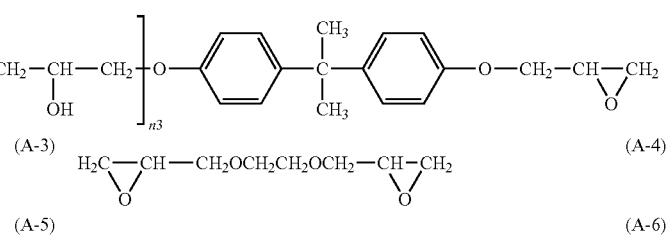

(A-6)

(A-7)

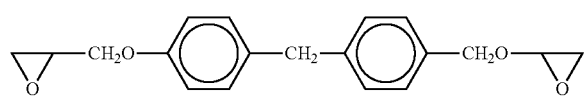

(A-8)

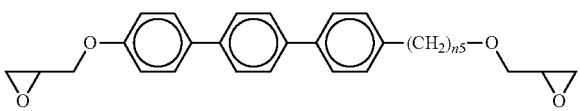

The curing agent represented by the formula (B) contains two amino groups in one molecule. Examples of the curing agent containing two amino groups in one molecule include phenylenediamine, diaminodiphenylmethane, diaminodiphenylsulfone, imidazole-based compounds, and dihydrazide-based compounds.

Specific examples of the curing agent represented by the formula (B) include curing agents represented by the following formulas (B-1) to (B-19). In particular, a curing agent represented by the following formula (B-17) is preferred. Monomers represented by the following formulas (B-11) to (B-13) are specific examples of the dihydrazide-based compounds. Monomers represented by the following formulas (B-14) and (B-15) are specific examples of the imidazole-based compounds. A monomer represented by the following formula (B-17) is a specific example of the -continued

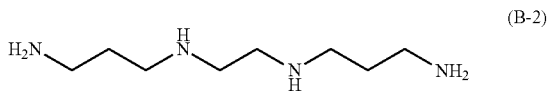

(B-2)

(B-3)

(B-4)

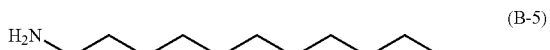

(B-5)

Preferably, the epoxy-based monomer is a monomer represented by the following formula (A-8), and the curing agent is a monomer represented by the following formula (B-17). The epoxy-based monomer represented by the following formula (A-8) contains a terphenyl alkylene group, and the curing agent represented by the following formula (B-17) contains a biphenyl group. Both are highly soluble in liquid crystal materials used in liquid crystal display devices, and these components are thus a suitable combination. Due to high compatibility with the liquid crystal material, polymer aggregation does not easily occur, and a polymer mass is less likely to be formed. Thus, it is possible to prevent or reduce bright dots, which are attributable to the formation of a polymer mass, during use of the liquid crystal display device. In addition, each polymer layer 50 formed by these monomers is a structure containing many phenylene groups, and is thus suitably used in order to increase the image sticking resistance to alternating current (AC) voltage.

[Chem. 29]

wherein n5 is an integer of 1 to 6.

[Chem. 30]

Preferably, the epoxy-based monomer is a monomer represented by the following formula (A-1), and the curing agent is a monomer represented by the following formula (B-1). These components are a suitable combination because heat-induced reaction easily occurs when the epoxy-based monomer represented by the following formula (A-1) has two epoxy groups and the curing agent represented by the following formula (B-1) has two amino groups. In addition, each polymer layer 50 formed by these monomers is a structure containing many phenylene groups, and is thus suitably used in order to increase the image sticking resistance to alternating current (AC) voltage.

[Chem. 31]

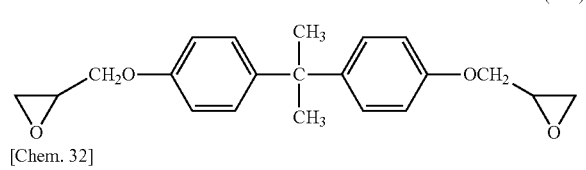
(A-1)

[Chem. 32]

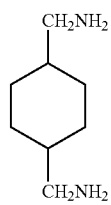
(B-1)

Preferably, the epoxy-based monomer is a monomer represented by the following formula (A-6), and the curing agent is a monomer represented by the following formula (B-9). The epoxy-based monomer represented by the following formula (A-6) contains two phenylene groups, and the curing agent represented by the following formula (B-9) contains a cyclohexylene skeleton. These components are a suitable combination because they are structures similar to the liquid crystal material and are highly soluble in the liquid crystal material used in the liquid crystal display device. In addition, each polymer layer 50 formed by these monomers is a structure containing many phenylene groups, and is thus suitably used in order to increase the image sticking resistance to alternating current (AC) voltage.

[Chem. 33]

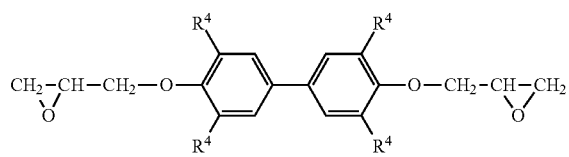
(A-6)

wherein R⁴ represents an —H or —CH₃ group.

[Chem. 34]

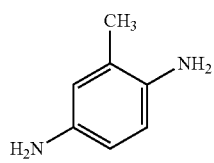
(B-9)

Preferably, the epoxy-based monomer is a monomer represented by the following formula (A-7), and the curing agent is a monomer represented by the following formula (B-13). The epoxy-based monomer represented by the following formula (A-7) contains two phenylene groups, and the curing agent represented by the following formula (B-13) also contains a phenylene group. These components are a suitable combination because they are structures similar to the liquid crystal material and are highly soluble in the liquid crystal material used in the liquid crystal display device. In addition, the polymer layer 50 formed by these monomers is a structure containing many phenylene groups, and is thus suitably used in order to increase the image sticking resistance to alternating current (AC) voltage.

[Chem. 35]

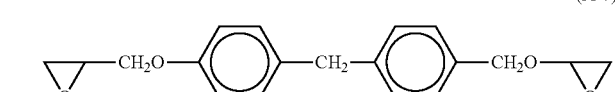
(A-7)

[Chem. 36]

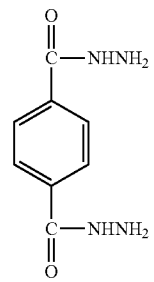
(B-13)

In order to effectively prevent radical transfer to the liquid crystal molecules, the polymer layers 50 are preferably made thicker. Specifically, the layer thickness is preferably 5 nm or more, more preferably 10 nm or more, particularly preferably 20 nm or more. Meanwhile, the concentrations of the epoxy-based monomer and the curing agent to be introduced into the liquid crystal composition need to be high in order to increase the thickness of the polymer layers 50. Yet, when these concentrations are high, unreacted monomers may remain in the liquid crystal layer 30 or unreacted monomers may be directly incorporated into the polymer layers 50, which may reduce the reliability. Thus, in view of the reliability of the liquid crystal display device according to this embodiment, the thickness of the polymer layers 50 is preferably 100 nm or less, more preferably 50 nm or less, particularly preferably 25 nm or less. The thickness is the average thickness of the polymer layers 50.

The seal 60 is disposed to surround the liquid crystal layer 30. The material (sealant) of the seal 60 may be an epoxy resin containing an inorganic or organic filler and a curing agent. The sealant of the seal 60 may be a photocurable sealant that is cured by ultraviolet light or the like, or may be a thermally curable sealant that is cured by heat. When a photocurable sealant is used, for example, the sealant is cured by ultraviolet light irradiation with the display region shielded from the light, whereby the substrates 10 and 20 are bonded to each other. When the thermally curable sealant is used, it is possible to thermally cure the sealant and form the polymer layers 50 simultaneously.

The display mode of the liquid crystal display device is not particularly limited, but it is preferably a twisted nematic (TN) mode, an electrically controlled birefringence (ECB) mode, an in-plane switching (IPS) mode, a fringe-field switching (FFS) mode, a vertical alignment (VA) mode, or a vertical alignment twisted nematic (VATN) mode.

When the alignment mode is a horizontal alignment mode, radicals easily generate from the photoalignment films. Thus, the effects of the present invention can be markedly achieved. In other words, the photoalignment treatment (polarized UV irradiation) in the vertical alignment mode only requires the pre-tilt angle to be slightly tilted from 90°, but the photoalignment treatment in the horizontal alignment mode requires high precision control of the orientation of the liquid crystal alignment (orientation in the substrate surface). Thus, the dose in the photoalignment treatment in the horizontal alignment mode is usually greater by an order of magnitude or more than the dose in the vertical alignment mode, and more radicals tend to generate due to side reactions in the horizontal alignment mode than in the vertical alignment mode. As a countermeasure, the polymer layers 50 of this embodiment can effectively prevent dissolution of radicals generated during the photoalignment treatment into the liquid crystal layer 30. In view of the above, the photoalignment films 40 are preferably those that substantially horizontally align the liquid crystal molecules in the liquid crystal layer 30, and the alignment mode of the liquid crystal display device according to this embodiment is preferably a TN mode, an IPS mode, or an FFS mode.

In the FFS mode, at least one of the substrates 10 and 20 includes a structure including a planar electrode, a slit electrode, and an insulating film between the planar electrode and the slit electrode (FFS electrode structure), and an oblique electric field (fringe electric field) is formed in the liquid crystal layer 30. Usually, the slit electrode, the insulating film, and the planar electrode are arranged in this order from the liquid crystal layer 30. The slit electrode may be, for example, one including, as slits, linear opening portions each surrounded by electrodes, or one having a comb shape including multiple comb teeth in which linear cuts are arranged as slits between the comb teeth.

In the IPS mode, at least one of the substrates 10 and 20 includes a pair of comb-shaped electrodes, and a transverse electric field is formed in the liquid crystal layer 30. The pair of comb-shaped electrodes may be, for example, one in which each electrode includes multiple comb teeth which are arranged to mesh with each other.

In the VATN mode, one of the substrates 10 and 20 is provided with pixel electrodes while the other of the substrates 10 and 20 is provided with a common electrode, and a vertical electric field is formed in the liquid crystal layer 30. The photoalignment films 40 disposed on the respective substrates 10 and 20 are vertical alignment films, and their alignment treatment directions are perpendicular to each other. In the VATN mode, the photoalignment treatment is suitably employed because the pre-tilt angle needs to be precisely controlled.

In addition, the substrates 10 and 20 each may be provided with a polarizer (linear polarizer) 70 on the respective sides opposite to the liquid crystal layer 30. The polarizer 70 is typified by one including a polyvinyl alcohol (PVA) film on which an anisotropic material such as a dichromic iodine complex is absorbed and aligned. Usually, a protection film such as a triacetyl cellulose film is laminated on both sides of the PVA film for practical use. In addition, an optical film such as a phase difference film may be disposed between the polarizer 70 and the substrates 10 and 20.

As shown in FIG. 1, the liquid crystal display device according to this embodiment includes the backlight 80 at the back side of a liquid crystal panel. The liquid crystal display device having such a structure is generally referred to as a transmissive liquid crystal display device. The backlight 80 is not particularly limited as long as it emits light including visible light. It may be one that emits light including only visible light, or may be one that emits light including both visible light and ultraviolet light. In order to allow the liquid crystal display device to perform a color display, the backlight 80 preferably emits white light. The light source of the backlight 80 is preferably alight emitting diode (LED), for example. As used herein, the term "visible light" refers to light having a wavelength of 380 nm or more and less than 800 nm (electromagnetic waves).

One of the main features of this embodiment is that dissolution of radicals generated from the photoalignment films 40 upon exposure to the backlight 80 into the liquid crystal layer 30 is prevented by the polymer layers 50. Thus, the function of the polymer layers 50 can be particularly effectively exerted when at least a part of the emission spectrum of the backlight 80 overlaps at least a part of the absorption spectrum of the photoalignment films 40.

The liquid crystal display device according to this embodiment includes, in addition to the liquid crystal panel and the backlight 80, multiple components including external circuits such as a tape carrier package (TCP) and a printed circuit board (PCB); optical films such as a viewing angle widening film and a luminance enhancement film; and a bezel (frame). Some components may be integrated into other components. Members other than those described above are not particularly limited, and those commonly used in the field of liquid crystal display devices may be used. Thus, the descriptions of such components are omitted.

<Method for Producing Liquid Crystal Display Device>

Next, the method for producing a liquid crystal display device according to this embodiment is described.

The method for producing a liquid crystal display device according to this embodiment includes: forming a photoalignment film on at least one of paired substrates; enclosing a liquid crystal composition containing a liquid crystal material, an epoxy-based monomer represented by the following formula (A), and a curing agent represented by the following formula (B) between the substrates on at least one of which a photoalignment film is formed, so as to form a liquid crystal layer; and thermally curing the epoxy-based monomer to form a polymer layer between the photoalignment film and the liquid crystal layer through a reaction between the epoxy-based monomer and the curing agent by heating the liquid crystal layer:

[Chem. 37]

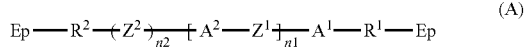

(A)

wherein Ep represents an epoxy group;

$R^1$ and $R^2$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$A^1$ and $A^2$ are the same as or different from each other and each represent a 1,4-phenylene group, a naphthalene-1,4-diyl group, a naphthalene-2,6-diyl group, a 1,4-cyclohexylene group, a C2-C18 alkyl, a C2-C18 alkylene group, a C2-C18 unsaturated alkyl, or a C2-C18 unsaturated alkylene group;

—CH$_2$— groups of $A^1$ and $A^2$ are each optionally replaced by an —O— group or an —S— group as long as they are not adjacent to each other;

one or more hydrogen atoms of $A^1$ and $A^2$ are each optionally replaced by a fluorine atom, a chlorine atom, a —CN group, a C1-C6 alkyl group, a C1-C6 alkoxy group, a C1-C6 alkylcarbonyl group, a C1-06 alkoxycarbonyl group, or a C1-C6 alkylcarbonyloxy group;

$Z^1$ represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$Z^2$ has a structure represented by the following formula (A-a);

n1 is 0, 1, 2, 3, 4, or 5; and n2 is 0 or 1,

[Chem. 38]

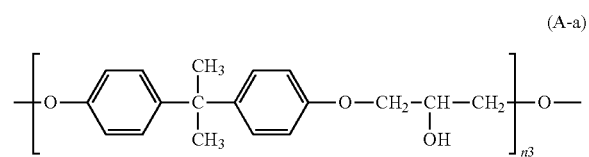

(A-a)

wherein n3 is an integer of 1 to 18,

[Chem. 39]

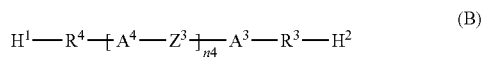

(B)

wherein $H^1$ and $H^2$ are the same as or different from each other and each represent an amino group, a dimethylamino group, a hydrazide group, or an imidazole group;

$R^3$ and $R^4$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$A^3$ and $A^4$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl group, a C2-C18 unsaturated alkylene group, or a —CO- or —CO—CO— group;

—CH$_2$— groups of $A^3$ and $A^4$ are each optionally replaced by an —O— group, an —S— group, or an —NH— group as long as they are not adjacent to each other;

one or more hydrogen atoms of $A^3$ and $A^4$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

$Z^3$ represents an —O— group, an —S— group, an —NH— group, a —CO— group, a —COO— group, a —OCO— group, an —NHCO— group, a —CONH— group, a —CH$_2$— group, a —CH(CH$_3$)— group, a —C(CH$_3$)$_2$— group, a —CF$_2$— group, or a direct bond; and n4 is 0, 1, 2, 3, 4, or 5.

The method for producing a liquid crystal display device according to this embodiment includes forming the polymer layers 50 one of which is between the liquid crystal layer 30 and one photoalignment film 40 and the other is between the liquid crystal layer 30 and the other photoalignment film 40. Thus, it is possible to reduce the region (area) where photoreactive functional groups in the photoalignment films 40 are in direct contact with liquid crystal molecules in the liquid crystal layer 30. Thus, even if radicals are generated from photoreactive functional groups in the photoalignment films 40 due to ultraviolet light or visible light emitted from the backlight 80, it is possible to prevent transfer of the radicals to the liquid crystal molecules. The same applies in a high-temperature environment.

In addition, since the polymer layers 50 are formed by thermal polymerization between the epoxy-based monomer and the curing agent, it is unnecessary to irradiate the liquid crystal layer 30 with light when forming the polymer layers 50. Thus, it is possible to suppress generation of radicals from the photoalignment films 40 when forming the polymer layers 50.

As described above, the method for producing a liquid crystal display device according to this embodiment includes forming the photoalignment films 40, but can prevent transfer of radicals to the liquid crystal molecule because the method also includes forming the polymer layers 50 one of which is between the liquid crystal layer 30 and one photoalignment film 40 and the other is between the liquid crystal layer 30 and the other photoalignment film 40 by thermal polymerization between the epoxy-based monomer and the curing agent. As a result, it is possible to produce a liquid crystal display device capable of maintaining a favorable voltage holding ratio and reducing or preventing image sticking, stains, and a decrease in contrast ratio for a long time not only in a room-temperature environment but also in a high-temperature environment.

Each step is further described below, but each component is as described above so that the description thereof is omitted.

In the forming of a photoalignment film, first, a photoreactive functional group-containing polymer (photoreactive group-containing polymer) is dissolved in a solvent such as an organic solvent to prepare a liquid crystal alignment agent. The liquid crystal alignment agent may contain other optional components. Preferably, the liquid crystal alignment agent is prepared as a solution-like composition whose components are dissolved in a solvent. The organic solvent is preferably one that dissolves the photoreactive group-containing polymer and the other optional components but does not react therewith. Examples of the other optional components include polymers other than the photoreactive group-containing polymer, curing agents other than the curing agent represented by the formula (B), curing accelerators, and catalysts. The polymers other than the photoreactive group-containing polymer may be used to further improve the solution characteristics of the liquid crystal alignment agent and the electric properties of the alignment films. Examples of such polymers include polymers for typical alignment films without photoreactive functional groups. As described above, the photoreactive functional group is preferably an azobenzene group, a chalcone group, or a cinnamate group. In addition, as described above, the photoalignment film preferably contains a polymer selected from the group consisting of a polyamic acid, a polyimide, a polysiloxane, a polyvinyl, and polymaleimide.

Next, the liquid crystal alignment agent is applied to the surfaces of the substrates 10 and 20. Non-limiting examples of the application technique include a roll coater technique, a spinner technique, a printing technique, and an ink-jet technique.

Next, the substrates 10 and 20 are heated. Thus, the solvent in the liquid crystal alignment agent is evaporated and the photoalignment films 40 are formed. Heating may be performed in two stages of pre-baking and post-baking.

Next, the photoalignment films 40 are subjected to photoalignment treatment so that a desired alignment-controlling force is given to the photoalignment films 40. Specifically, the photoalignment films 40 are irradiated with (exposed to) light such as ultraviolet light or visible light. As a result, the aforementioned structural change occurs in photoreactive functional groups in the photoreactive group-containing polymer, thus changing at least part of the molecular structure and/or alignment of the photoreactive group-containing polymer. This allows the photoalignment films 40 to control the alignment of liquid crystal molecules in contact with the surfaces thereof. Usually, the structural change does not occur in every photoreactive functional group. Thus, at least some of the photoreactive functional groups remain in the photoalignment films 40 even after the photoalignment treatment.

The light used in the photoalignment treatment may be ultraviolet light, visible light, or both of them. The light used in the photoalignment treatment may be either polarized light or non-polarized light. For example, the light may be polarized light such as linearly polarized light, elliptically polarized light, or circularly polarized light, or non-polarized light. It is particularly preferable to irradiate the photoalignment films with polarized ultraviolet light.

Preferably, the photoalignment films 40 contain a photoreactive functional group-containing polymer, and the photoreactive functional group-containing polymer is irradiated with polarized ultraviolet light during the forming of a photoalignment film.

The photoalignment films 40 are preferably photoalignment films that substantially horizontally align liquid crystal molecules in the liquid crystal layer 30 by polarized light irradiation or photoalignment films that substantially vertically align liquid crystal molecules in the liquid crystal layer 30 by polarized light irradiation.

The photoalignment film 40 may be formed only on one of the substrates 10 and 20. Division alignment treatment may be performed for multi-domain formation.

In the forming of a liquid crystal layer, first, a liquid crystal composition containing a liquid crystal material, an epoxy-based monomer represented by the formula (A), and a curing agent represented by the formula (B) is prepared. The liquid crystal material contains at least one type of liquid crystal molecules.

The amount of the epoxy-based monomer represented by the formula (A) in the whole liquid crystal composition is preferably 0.001% by weight or more and 0.5% by weight or less. If the amount is less than 0.001% by weight, the resulting polymer layer may not be thick enough. If the amount is more than 0.5% by weight, many unreacted monomers may remain in the liquid crystal layer. The upper limit of the amount is more preferably 0.4% by weight, still more preferably 0.3% by weight. The lower limit thereof is more preferably 0.03% by weight, still more preferably 0.05% by weight.

The amount of the curing agent represented by the formula (B) in the whole liquid crystal composition is preferably 0.001% by weight or more and 0.5% by weight or less. If the amount is less than 0.001% by weight, the resulting polymer layer may not be thick enough. If the amount is more than 0.5% by weight, many unreacted monomers may remain in the liquid crystal layer. The upper limit of the amount is more preferably 0.4% by weight, still more preferably 0.3% by weight. The lower limit thereof is more preferably 0.03% by weight, still more preferably 0.05% by weight.

The compounding ratio of the epoxy-based monomer to the curing agent in the whole liquid crystal composition is preferably 1.0:0.8 to 1.0:1.2. If the compounding ratio is outside the above range, unreacted epoxy-based monomers or curing agent may remain in the liquid crystal layer, resulting in a low VHR or causing image sticking. The compounding ratio of the epoxy-based monomer to the curing agent is more preferably 1.00:0.95 to 1.00:1.05.

Next, the liquid crystal composition is placed between the substrates 10 and 20 by vacuum filling or one drop filling to form the liquid crystal layer 30. In the case of vacuum filling, application of a sealant, attachment of the substrates 10 and 20, curing of the sealant, filling with the liquid crystal composition, and sealing of the filling port are performed in this order. Thus, a liquid crystal cell filled with the liquid crystal composition is formed. In the case of one drop filling, application of a sealant, dropping of the liquid crystal composition, attachment of the substrates 10 and 20, and curing of the sealant are performed in this order. Thus, a liquid crystal cell filled with the liquid crystal composition is formed. As described above, the liquid crystal layer 30 preferably contains a liquid crystal material having negative anisotropy of dielectric constant.

Figure 2:
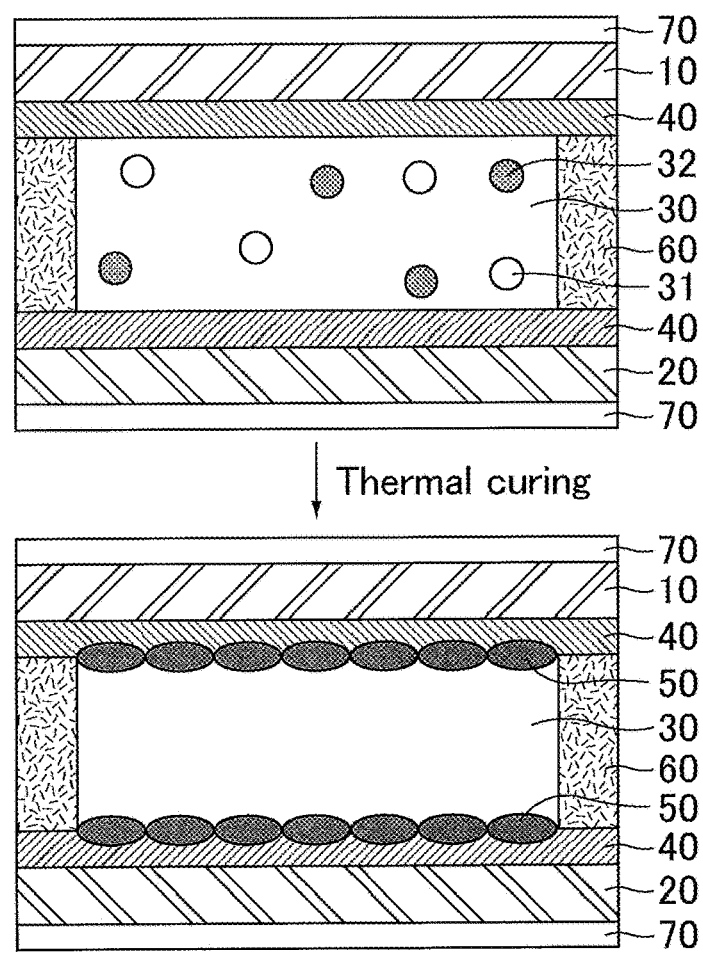
FIG. 2 shows schematic views for describing the process of polymer layer formation in a method for producing a liquid crystal display device according to Embodiment 1.

In the thermal curing, the liquid crystal layer 30 is heated to cause a reaction between the epoxy-based monomer and the curing agent, thus forming a polymer. As the polymer is phase-separated from the liquid crystal layer 30, the polymer layer 50 is formed between the liquid crystal layer 30 and each photoalignment film 40. FIG. 2 shows schematic views for describing the process of polymer layer formation in a method for producing a liquid crystal display device according to Embodiment 1. The liquid crystal layer 30 before thermal curing contains a liquid crystal material. Further, an epoxy-based monomer 31 and a curing agent 32 are dissolved in the liquid crystal layer 30. Heating the liquid crystal layer 30 causes thermal polymerization between the epoxy-based monomer 31 and the curing agent 32, resulting in the formation of a polymer. Further, phase-separation of the polymer results in the formation of the polymer layers 50 one of which is between the liquid crystal layer 30 and one photoalignment film 40 and the other is between the liquid crystal layer 30 and the other photoalignment film 40. The epoxy-based monomer 31 contains two epoxy groups, and the curing agent 32 contains two amino groups or the like. Thus, even if the epoxy-based monomer 31 and/or the curing agent 32 are/is partially unreacted, these groups will react with functional groups in the photoalignment films 40 and be incorporated into the photoalignment films 40, resulting in almost no residues of the epoxy-based monomer 31 and the curing agent 32.

Conditions such as heating temperature, heating time, and heating means are not particularly limited, but the thermal curing is preferably performed at a temperature lower than the nematic-isotropic transition temperature of the liquid crystal material and not lower than the curing reaction temperature at which the epoxy-based monomer reacts with the curing agent. When the thermal curing is performed in the temperature range described above, the liquid crystal alignment can be effectively fixed (stabilized). Consequently, the alignment stability can be improved. The nematic-isotropic transition temperature of the liquid crystal material can be determined by, for example, differential scanning calorimetry (DSC) or by a technique of directly observing the temperature dependence of the liquid crystal material placed in a capillary. The curing reaction temperature can be measured by, for example, differential scanning calorimetry or the like.

After the polymer layer is formed, the liquid crystal layer 30 may be subjected to re-alignment treatment. Specifically, the re-alignment treatment may be performed by a method in which the liquid crystal layer 40 is heated at a temperature higher than the nematic-isotropic transition temperature of the liquid crystal material in the liquid crystal layer 30, and then cooled down to room temperature. This removes flow alignment of liquid crystal molecules and allows the liquid crystal molecules to be aligned along the molecular structure of the photoalignment films 40, so that the liquid crystal layer 30 exhibits a desired alignment state.

The photoalignment films 40 preferably contain a polymer containing a carboxyl group. The photoreactive functional group-containing polymer and the polymer containing a carboxyl group may be individual polymers; or the photoreactive functional group-containing polymer may further contain a carboxyl group. More preferably, a bond is formed between the carboxyl group and the epoxy-based monomer by heating the liquid crystal layer 30. The bond is preferably formed by thermal polymerization by heating. Since an epoxy group can also react with a carboxyl group, heating the liquid crystal layer 30 allows a carboxyl group in the polymer containing a carboxyl group and/or the photoreactive functional group-containing polymer in the photoalignment films 40 to thermally react with and bind to an epoxy group in an epoxy-based monomer constituting each polymer layer 50. Thus, chemical bonds can be formed between the photoalignment films 40 and the polymer layers 50, significantly lowering the possibility of partial dissolution of the polymer constituting the polymer layers 50 into the liquid crystal layer 30. This makes it possible to more effectively reduce or prevent a decrease in VHR and contrast ratio.

The photoalignment films 40 preferably contain a polymer containing an epoxy group. The photoreactive functional group-containing polymer and the polymer containing an epoxy group may be individual polymers; or the photoreactive functional group-containing polymer may further contain an epoxy group. More preferably, a bond is formed between the epoxy group and the curing agent by heating the liquid crystal layer 30. The bond is preferably formed by thermal polymerization by heating. Heating the liquid crystal layer 30 allows an epoxy group in the polymer containing an epoxy group and/or the polymer containing the photoreactive functional group in the photoalignment films 40 to thermally react with and bind to an amino group or the like constituting each polymer layer 50. Thus, chemical bonds can be formed between the photoalignment films 40 and the polymer layers 50, significantly lowering the possibility of partial dissolution of the polymer constituting the polymer layers 50 into the liquid crystal layer 30. This makes it possible to more effectively reduce or prevent a decrease in VHR and contrast ratio.

The bond between the carboxyl group and the epoxy-based monomer and the bond between the epoxy group and the curing agent may be formed at any timing after the liquid crystal layer is formed. For examples, the bonds may be formed during the thermal curing. Alternatively, the bonds may be formed not during the thermal curing. The bonds may be formed at any timing after the thermal curing, for example, during aging which is performed with the backlight turned on. The bond between the carboxyl group and the epoxy-based monomer and the bond between the epoxy group and the curing agent may be formed during use of the liquid crystal display device.

The above steps are followed by attachment of polarizers and attachment of components such as a control unit, a power supply unit, and a backlight. Thus, the liquid crystal display device of this embodiment is completed.

As described above, the alignment mode (display mode) of the produced liquid crystal display device is preferably a TN mode, an ECB mode, an IPS mode, an FFS mode, a VA mode, or a VATN mode.

Each feature described for the above embodiment of the present invention is applicable to all aspects of the present invention.

Comparative Embodiment 1

Figure 3:
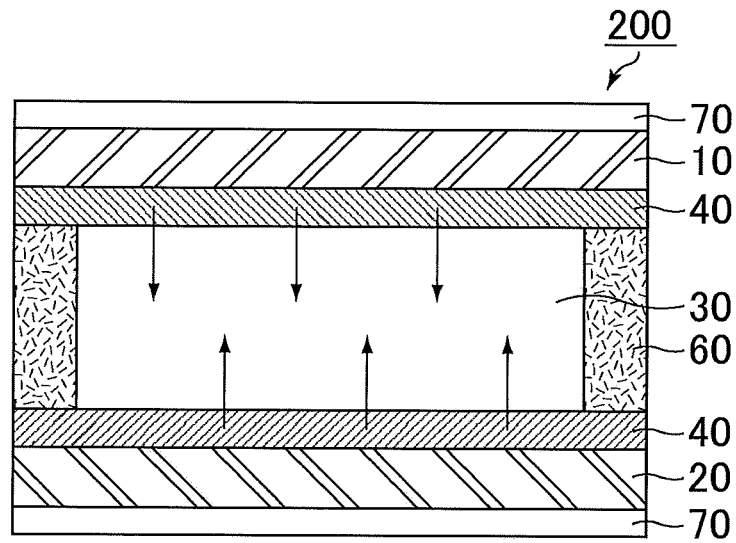
FIG. 3 shows a schematic cross-sectional view of a liquid crystal display device according to Comparative Embodiment 1.

FIG. 3 shows a schematic cross-sectional view of a liquid crystal display device according to Comparative Embodiment 1. As shown in FIG. 3, the liquid crystal display device according to Comparative Embodiment 1 has the same structure as the liquid crystal display device according to Embodiment 1, except that the polymer layers 50 are not included. The liquid crystal display device according to Comparative Embodiment 1 can be produced using a liquid crystal composition that contains a liquid crystal material but does not contain either the epoxy-based monomer or the curing agent. Since the liquid crystal display device according to Comparative Embodiment 1 does not include the polymer layers 50 one of which is between the liquid crystal layer 30 and one photoalignment film 40 and the other is between the liquid crystal layer 30 and the other photoalignment film 40, radicals generated in the photoalignment films 40 are easily transferred to liquid crystal molecules in the liquid crystal layer 30. The radicals transferred are ultimately ionized. This decreases the voltage holding ratio and causes image sticking and/or stains. In contrast, in the embodiment of the present invention, owing to the presence of the polymer layers 50 one of which is between the liquid crystal layer 30 and one photoalignment film 40 and the other is between the liquid crystal layer 30 and the other photoalignment film 40, it is possible to reduce the region (area) where photoreactive functional groups in the photoalignment films 40 are in direct contact with the liquid crystal molecules in the liquid crystal layer 30. Thus, even if radicals are generated from photoreactive functional groups in the photoalignment films 40 due to ultraviolet light or visible light emitted from the backlight, it is possible to prevent transfer of the radicals to the liquid crystal molecules.

Comparative Embodiment 2

Figure 4:
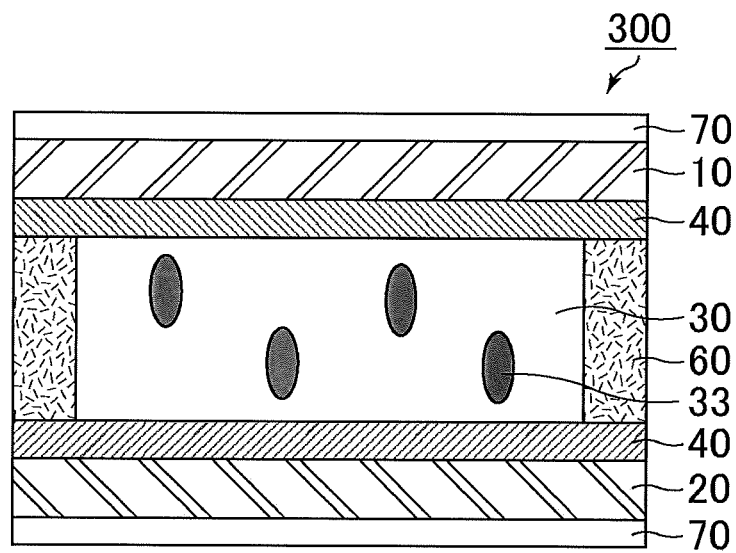
FIG. 4 shows a schematic cross-sectional view of a liquid crystal display device according to Comparative Embodiment 2.

FIG. 4 shows a schematic cross-sectional view of a liquid crystal display device according to Comparative Embodiment 2. As shown in FIG. 4, the liquid crystal display device according to Comparative Embodiment 2 has the same structure as the liquid crystal display device according to Embodiment 1, except that the polymer layers 50 are not included and the radical scavenger 31 is added to the liquid crystal layer 30. The liquid crystal display device according to Comparative Embodiment 2 can be produced using a liquid crystal composition containing a liquid crystal material and a radical scavenger 33 but not containing either the epoxy-based monomer or the curing agent. In the case of a method that merely adds (dissolves) the radical scavenger 33 to (in) the liquid crystal layer 30, the radical scavenger 31 will remain in the liquid crystal layer. The radical scavenger 33 can freely diffuse, and thus may thermally react with specific components of the photoalignment films 40 or the seal 60, producing impurities or slightly changing physical properties of the liquid crystal material. In contrast, in the embodiment of the present invention, additives such as the epoxy-based monomer and the curing agent are prevented from remaining in the liquid crystal layer 30, so that it is possible to prevent additional thermal reactions of the additives and changes in physical properties of the liquid crystal material.

The present invention is described below in more detail with reference to examples and comparative examples. The examples, however, are not intended to limit the scope of the present invention.

SYNTHESIS EXAMPLE 1

In Synthesis Example 1, a polyamic acid containing an azobenzene group as a photoreactive functional group in the main chain was synthesized. An acid anhydride (0.10 mol) represented by the following formula (P) was added to a γ-butyrolactone solution containing photoreactive functional group (azobenzene)-containing diamine (0.05 mol) represented by the following formula (N) and diamine not containing a photoreactive functional group (0.05 mol) represented by the following formula (O) to effect a reaction at 40° C. for 10 hours. Thus, a polyamic acid having a random structure was obtained. The polyamic acid obtained had a weight average molecular weight of 50,000 and a molecular weight distribution of 2.5.

[Chem. 40]

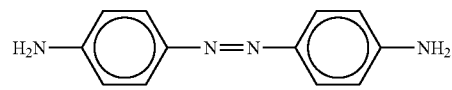
(N)

[Chem. 41]

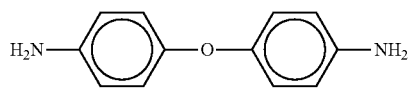
(O)

[Chem. 42]

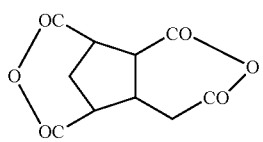
(P)

The polyamic acid obtained is a polyamic acid represented by the following formula (D) wherein V1 is a structure represented by the following formula (E-5) and Y1 is a unit containing an azobenzene group represented by the following formula (H-1) or a unit represented by the following formula (G-10). The side chain W1 is not introduced into the polyamic acid represented by the following formula (D). A unit containing an azobenzene group represented by the following formula (H-1) and a unit represented by the following formula (G-10) were introduced at a ratio of 1:1.

[Chem. 43]

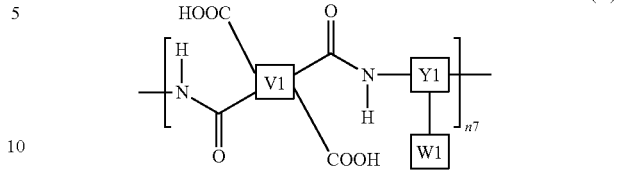
(D)

[Chem. 44]

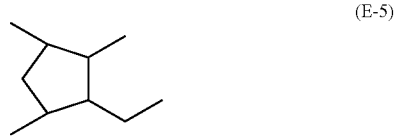
(E-5)

[Chem. 45]

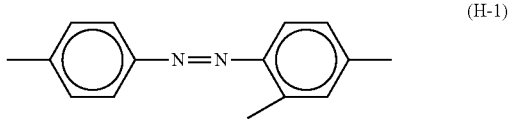
(H-1)

[Chem. 46]

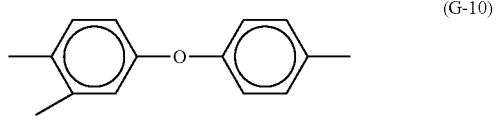
(G-10)

SYNTHESIS EXAMPLE 2

In Synthesis Example 2, a polyvinyl was synthesized containing a chalcone group as a photoreactive functional group on the side chain and also containing a carboxyl group.

A 1-methylpyrrolidone solution (5 mL) containing 4-hydroxychalcone (1.5 g, 6.5 mmol) represented by the following formula (R) was dropped to a 1-methylpyrrolidone solution (20 mL) containing an acrylic acid polymer (1.3 g) represented by the following formula (Q). Subsequently, a 1-methylpyrrolidone solution (5 mL) containing DCC (N,N'-dicyclohexylcarbodiimide) (100 mg) and triethylamine (TEA) (100 mg) was dropped thereto to effect a reaction at 60° C. in nitrogen atmosphere for 24 hours. Subsequently, a sodium hydroxide solution was dropped thereto to convert unreacted carboxyl groups into a sodium salt of carboxylic acid. Thus, a precipitate was obtained. The precipitate obtained was recovered using an evaporator, and the recovered product was dissolved and re-precipitated in a mixed solvent of methanol as a poor solvent and water as a good solvent. Ultimately, using cation exchange chromatography, the sodium salt of carboxylic acid was converted back to a carboxylic acid, and a polyvinyl containing a chalcone group and a carboxyl group represented by the following formula (S) was obtained. The polyvinyl obtained had a weight average molecular weight of 25,000 and a molecular weight distribution of 2.1. Here, p in the following formula (Q) and n9 in the following formula (S) each represent a polymerization degree and are each an integer of 1 or more.

[Chem. 47]

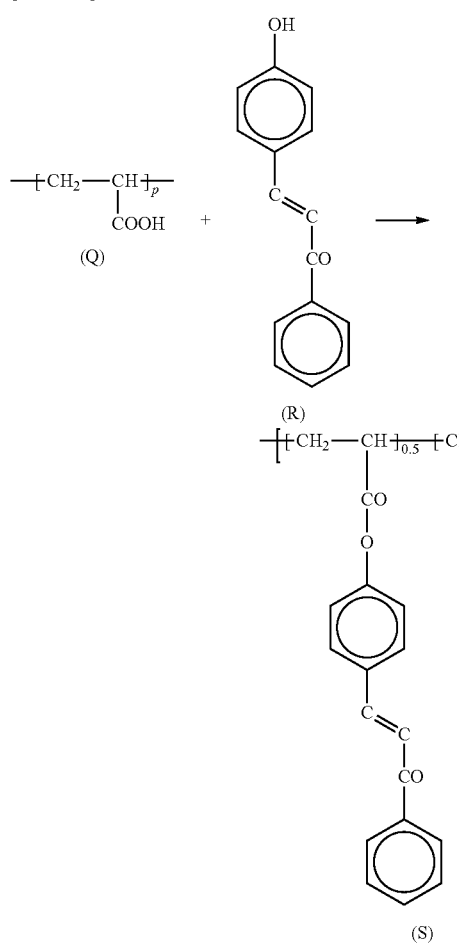

SYNTHESIS EXAMPLE 3

In Synthesis Example 3, a polysiloxane containing an epoxy group and a cinnamate group as a photoreactive functional group on the side chains was synthesized. A polysiloxane containing an epoxy group on the side chain (q represents a polymerization degree and is an integer of 1 or more) and a compound containing a cinnamate group were reacted at 90° C. Thus, a polysiloxane represented by the following formula (K-1) was obtained. In the polysiloxane obtained, β1 was a structure represented by the following formula (L-1) and m1 was 0.5. Here, n8 represents a polymerization degree and is an integer of 1 or more.

[Chem. 48]

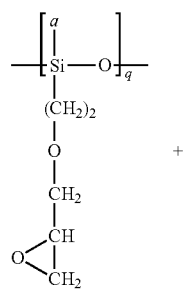

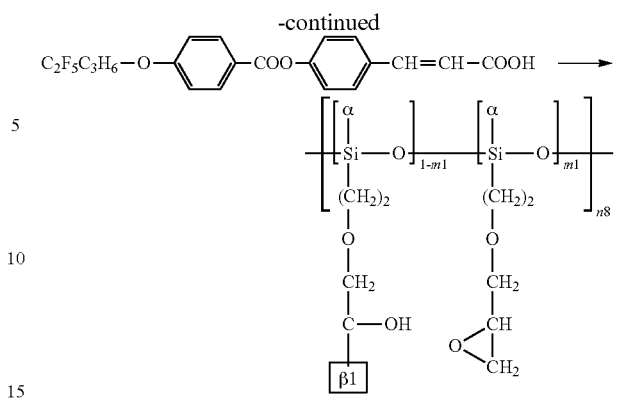

(K-1)

[Chem. 49]

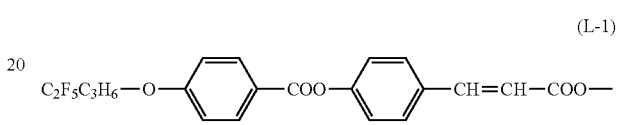

(L-1)

Example 1

An FFS-mode liquid crystal cell was actually produced as follows.

First, an indium tin oxide (ITO) substrate provided with an FFS electrode structure formed of ITO and a counter substrate without electrodes were prepared. As the liquid crystal alignment agent, the liquid crystal alignment agent containing a polyamic acid containing an azobenzene group in the main chain (initial chemical imidization rate: 0%) produced in Synthesis Example 1 and a polyamic acid not containing an azobenzene group (initial chemical imidization rate: 0%) was prepared. The polyamic acid not containing an azobenzene group is a polyamic acid represented by the formula (D) wherein V1 is a structure represented by the formula (E-5) and Y1 contains only a unit represented by the formula (G-10) and does not contain a unit containing an azobenzene group represented by the formula (H-1). The side chain W1 is not introduced thereinto.

The liquid crystal alignment agent obtained was applied to both the ITO substrate and the counter substrate, and the workpieces were pre-baked at 90° C. for five minutes. Subsequently, the surfaces of the ITO substrate and counter substrate covered with the liquid crystal alignment agent were irradiated with 2 J/cm² of linearly polarized ultraviolet light with a center wavelength of 365 nm, so that alignment treatment was performed. The workpieces were then post-baked at 230° C. for 40 minutes, whereby bilayer-structured photoalignment films were obtained. Each bilayer-structured photoalignment film consists of a lower layer formed from a polyamic acid not containing a photoreactive functional group, and an upper layer formed from a polyamic acid containing a photoreactive functional group (azobenzene group). The upper layer is in contact with the liquid crystal layer. The thickness of the photoalignment film was estimated to be 10 to 40 nm from the blending ratio in the liquid crystal alignment agent.

Next, an ultraviolet-curable sealant (product name: Photolec S-WB, available from Sekisui Chemical Co., Ltd.) was applied in a pattern to one of the substrates using a dispenser. A liquid crystal composition was dropped to a predetermined position of the other substrate. The liquid crystal composition was a negative liquid crystal composition containing a liquid crystal material having negative anisotropy of dielectric constant, an epoxy-based monomer represented by the following formula (A-1), and a diamine curing agent represented by the following formula (B-1). The amount of the epoxy-based monomer was 0.3% by weight and the amount of the diamine curing agent was 0.3% by weight, relative to the whole liquid crystal composition. Subsequently, the substrates were attached to each other in vacuum, and the sealant was irradiated with ultraviolet light with the display area shielded from the light. Thus, a liquid crystal cell was formed.

[Chem. 50]

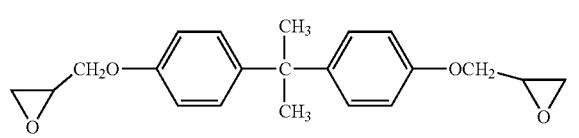

(A-1)

[Chem. 51]

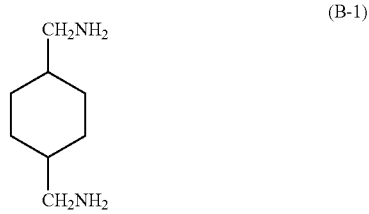

(B-1)

Subsequently, the liquid crystal cell was heated at 60° C. (a temperature lower than the nematic-isotropic transition temperature of the liquid crystal material and not lower than the curing reaction temperature at which the epoxy-based monomer reacts with the diamine curing agent) for 120 minutes. Thus, polymer layers were formed by thermal polymerization between the epoxy-based monomer and the diamine curing agent. Subsequently, in order to remove flow alignment of the liquid crystal, the liquid crystal cell was further heated at 130° C. (a temperature higher than the nematic-isotropic transition temperature of the liquid crystal material) for 40 minutes so that re-alignment treatment was performed to convert the liquid crystal into an isotropic phase. The liquid crystal cell was then cooled down to room temperature, whereby an FFS-mode liquid crystal cell was obtained. The thickness of the polymer layers was 5 to 30 nm as determined from thickness distribution results obtained by observation with a transmission electron microscope (TEM).

COMPARATIVE EXAMPLE 1

An FFS-mode liquid crystal cell according to Comparative Example 1 was produced in the same manner as in Example 1, except for using, as the liquid crystal composition, a negative liquid crystal composition containing a liquid crystal material having negative anisotropy of dielectric constant but not containing either the epoxy-based monomer represented by the formula (A-1) or the diamine curing agent represented by the formula (B-1).

COMPARATIVE EXAMPLE 2

An FFS-mode liquid crystal cell according to Comparative Example 2 was produced in the same manner as in Example 1, except for using, as the liquid crystal composition, a negative liquid crystal composition containing a liquid crystal material having negative anisotropy of dielectric constant and a nitroxyl radical scavenger but not containing either the epoxy-based monomer represented by the formula (A-1) or the diamine curing agent represented by the formula (B-1). The amount of the nitroxyl radical scavenger was 0.001% by weight relative to the whole liquid crystal composition.

<High-Temperature Test on Backlight>

In order to evaluate the heat resistance of the FFS-mode liquid crystal cells produced in Example 1 and Comparative Examples 1 and 2, each liquid crystal cell was left for aging for 5000 hours on a backlight in a turn-on state with the temperature of the liquid crystal cell raised to 75° C. The voltage holding ratio (VHR) and contrast ratio were determined before and after the test. Table 1 shows the results. The VHR was determined at 1 V and 70° C. using a VHR measurement system Model 6254 available from Toyo Corporation. The contrast ratio was determined at 25° C. using a spectroradiometer "SR-UL1R" available from Topcon Technohouse Corporation.

TABLE 1

|  | Before aging test | | After 5000-hour aging test | |
| --- | --- | --- | --- | --- |
|  | VHR (%) | Contrast ratio | VHR (%) | Contrast ratio |
| Example 1 | 98.9 | 1100 | 96.7 | 1050 |
| Comparative Example 1 | 99.3 | 1100 | 84.3 | 810 |
| Comparative Example 2 | 99.2 | 1000 | 94.5 | 940 |

As shown in Table 1, the results of Example 1 reveal that the polymer layers formed by thermal polymerization using the epoxy-based monomer and the diamine curing agent allowed the VHR and the contrast ratio to be maintained at high levels after the 5000-hour aging test, in comparison with Comparative Example 1. The above indicates that the polymer layer formation was effective in preventing transfer of radicals generated in the azobenzene group-containing photoalignment films to the negative liquid crystal material, thus reducing or preventing a decrease in VHR and contrast ratio. In contrast, in Comparative Example 2 in which a conventional nitroxy radical scavenger was introduced into the liquid crystal composition, an effect of reducing or preventing a decrease in VHR and contrast ratio after the 5000-hour aging test was achieved, but the contrast ratio after the test was lower than that before the test. Presumably, these results are due to the fact that the radical scavenger was capable of freely diffusing in the liquid crystal layer, resulting in significant fluctuations in liquid crystal alignment and slightly reducing the contrast ratio.

Example 2

An FFS-mode liquid crystal cell according to Example 2 was produced in the same manner as in Example 1, except for using, as the liquid crystal alignment agent, a liquid crystal alignment agent containing the polyamic acid containing an azobenzene group in the main chain used in Example 1 in which the initial chemical imidization rate was changed to 50% and the polyamic acid not containing an azobenzene group used in Example 1 in which the initial chemical imidization rate was changed to 50%.

<High-Temperature Test on Backlight>

For the FFS-mode liquid crystal cell produced in Example 2, the same evaluation test as in Example 1 was performed. Table 2 shows the results.

TABLE 2

|  | Before aging test | | After 5000-hour aging test | |
|---|---|---|---|---|
|  | VHR (%) | Contrast ratio | VHR (%) | Contrast ratio |
| Example 2 | 99.0 | 1050 | 95.3 | 970 |
| Example 1 | 98.9 | 1100 | 96.7 | 1050 |

As shown in Table 2 above, in Example 2, the initial chemical imidization rates of the azobenzene group-containing polyamic acid in the main chain and the polyamic acid not containing an azobenzene group were set to 50%. In comparison with Comparative Example 1 shown in Table 1 above, the liquid crystal cell of Example 2 reduced the decrease in VHR and contrast ratio after the aging test, indicating the effect of the polymer layer formation. At the same time, the VHR after the aging test was slightly lower in Example 2 than in Example 1. Presumably, in Example 1, since the polyamic acid as a constituent material of the photoalignment films had a low initial chemical imidization rate and the photoalignment films had many carboxyl groups, carboxyl groups in the polyamic acid thermally reacted with epoxy groups in the epoxy-based monomer, resulting in chemical bonds between the photoalignment films and the polymer layers. Owing to the formation of chemical bonds between the photoalignment films and the polymer layers, partial dissolution of the polymer constituting the polymer layer into the liquid crystal layer can be suppressed. Thus, the liquid crystal cell of Example 1 is considered to be capable of more effectively reducing or preventing a decrease in VHR and contrast ratio.

Example 3

An IPS mode liquid crystal cell was actually produced as follows.

First, an indium tin oxide (ITO) substrate provided with a pair of comb-shaped electrodes formed of ITO and a counter substrate without electrodes were prepared. As the liquid crystal alignment agent, a liquid crystal alignment agent containing a polyimide not containing a photoreactive functional group and a polyvinyl-based polymer containing a chalcone group and a carboxyl group represented by the following formula (S) produced in Synthesis Example 2 was prepared.

[Chem. 52]

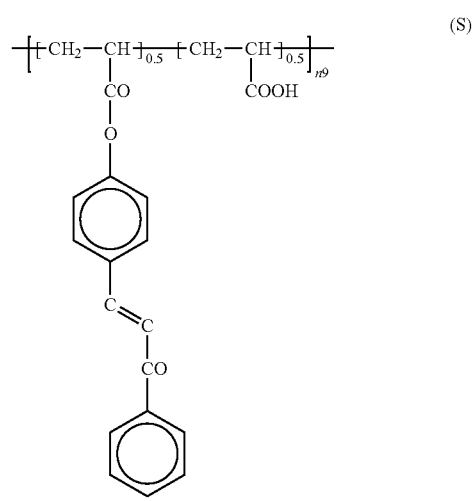

(S)

wherein n9 represents a polymerization degree and is an integer of 1 or more.

The liquid crystal alignment agent obtained was applied to each of the ITO substrate and the counter substrate, followed by pre-baking at 90° C. for five minutes and post-baking at 200° C. for 40 minutes, whereby bilayer-structured photoalignment films were obtained. Subsequently, the surfaces covered with the photoalignment films were irradiated with 2 J/cm² of linearly polarized ultraviolet light with a center wavelength of 365 nm, so that alignment treatment was performed. Each bilayer-structured photoalignment film consists of a lower layer formed from a polyimide not containing a photoreactive functional group, and an upper layer formed from a polyvinyl-based polymer containing a photoreactive functional group (chalcone group). The upper layer is in contact with the liquid crystal layer.

Next, an ultraviolet-curable sealant (product name: Photolec S-WB, available from Sekisui Chemical Co., Ltd.) was applied in a pattern to one of the substrates using a dispenser. A liquid crystal composition was dropped to a predetermined position of the other substrate. A negative liquid crystal composition containing a liquid crystal material having negative anisotropy of dielectric constant, an epoxy-based monomer represented by the following formula (A-6), and a diamine curing agent represented by the following formula (B-9) was used. The amount of the epoxy-based monomer was 0.3% by weight and the amount of the diamine curing agent was 0.3% by weight, relative to the whole liquid crystal composition. Subsequently, the substrates were attached to each other in vacuum, and the sealant was irradiated with ultraviolet light with the display area shielded from the light. Thus, a liquid crystal cell was formed.

[Chem. 53]

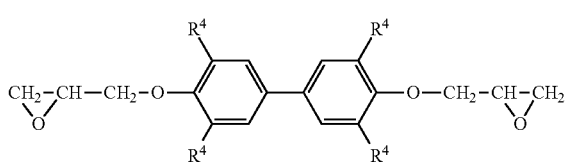

(A-6)

wherein $R^4$ represents an —H group.

[Chem. 54]

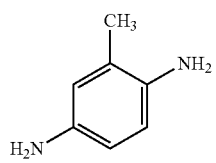
(B-9)

Subsequently, the liquid crystal cell was heated at 60° C. (a temperature lower than the nematic-isotropic transition temperature of the liquid crystal material and not lower than the curing reaction temperature at which the epoxy-based monomer reacts with the diamine curing agent) for 120 minutes. Thus, polymer layers were formed by thermal polymerization. Subsequently, in order to remove flow alignment of the liquid crystal, the liquid crystal cell was further heated at 130° C. (a temperature higher than the nematic-isotropic transition temperature of the liquid crystal material) for 40 minutes so that re-alignment treatment was performed to convert the liquid crystal into an isotropic phase. The liquid crystal cell was then cooled down to room temperature, whereby an IPS mode liquid crystal cell was obtained.

COMPARATIVE EXAMPLE 3

An IPS-mode liquid crystal cell according to Comparative Example 3 was produced in the same manner as in Example 3, except for using, as the liquid crystal composition, a negative liquid crystal composition containing a liquid crystal material having negative anisotropy of dielectric constant but not containing either the epoxy-based monomer represented by the formula (A-6) or the diamine curing agent represented by the formula (B-9).

<High-Temperature Test on Backlight>

For each of the IPS-mode liquid crystal cells produced in Example 3 and Comparative Example 3, the same evaluation test as in Example 1 was performed. Table 3 shows the results.

TABLE 3

|  | Before aging test | | After 5000-hour aging test | |
|---|---|---|---|---|
|  | VHR (%) | Contrast ratio | VHR (%) | Contrast ratio |
| Example 3 | 99.0 | 1200 | 95.5 | 1150 |
| Comparative Example 3 | 98.5 | 1150 | 86.4 | 850 |

As shown in Table 3, the results of Example 3 reveal that the polymer layers formed by thermal polymerization using the epoxy-based monomer and the diamine curing agent allowed the VHR and the contrast ratio to be maintained at high levels after the 5000-hour aging test in Example 3, in comparison with Comparative Example 3. The above indicates that the polymer layer formation was effective in preventing transfer of radicals generated in the chalcone group-containing photoalignment films to the negative liquid crystal material, thus reducing a decrease in VHR and contrast ratio.

Example 4

An FFS-mode liquid crystal cell according to Example 4 was produced in the same manner as in Example 1, except for using, as the liquid crystal composition, a negative liquid crystal composition containing a liquid crystal material having negative anisotropy of dielectric constant, an epoxy-based monomer represented by the following formula (A-8-1), and a diamine curing agent represented by the following formula (B-17). The epoxy-based monomer represented by the following formula (A-8-1) is an epoxy-based monomer represented by the formula (A-8-1) wherein n3 is 2. The amount of the epoxy-based monomer was 0.3% by weight and the amount of the diamine curing agent was 0.3% by weight, relative to the whole liquid crystal composition.

[Chem. 55]

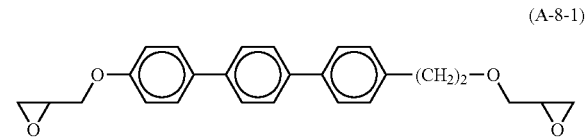
(A-8-1)

[Chem. 56]

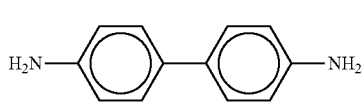
(B-17)

<High-Temperature Test on Backlight>

For the FFS-mode liquid crystal cell produced in Example 4, the same evaluation test as in Example 1 was performed. Table 4 shows the results.

TABLE 4

|  | Before aging test | | After 5000-hour aging test | |
|---|---|---|---|---|
|  | VHR (%) | Contrast ratio | VHR (%) | Contrast ratio |
| Example 4 | 99.0 | 1100 | 96.4 | 1050 |
| Example 1 | 98.9 | 1100 | 96.7 | 1050 |

In Example 4, terphenyl having a structure including three phenylene groups connected to each other was used as an epoxy-based monomer, and biphenyl having a structure including two phenylene groups connected to each other was used as a diamine curing agent. A structure containing a phenylene group is highly compatible with the liquid crystal material, and promotes thermal curing reaction between the epoxy-based monomer and the diamine curing agent in the liquid crystal. Thus, use of a compound containing a phenylene group in addition to an epoxy-based monomer and a diamine curing agent allows the epoxy-based monomer and the diamine curing agent to prevent or reduce display defects such as blight dots attributable to polymer aggregation in the liquid crystal layer. As shown in Table 4, the results of Example 4 reveal that the VHR and the contrast ratio in Example 4 were maintained at equivalent levels as those in Example 1, indicating a better effect of reducing or preventing a decrease in VHR and contrast ratio, in comparison to Comparative Example 1 shown in Table 1.

Example 5

A VATN-mode liquid crystal cell was actually produced as follows.

First, two indium tin oxide (ITO) substrates each provided with an electrode formed from ITO were prepared. As the liquid crystal alignment agent, a liquid crystal alignment agent containing a polyimide not containing a photoreactive functional group and a polysiloxane containing a cinnamate group and an epoxy group represented by the following formula (K-1) produced in Synthesis Example 2 was prepared. In the polysiloxane represented by the following formula (K-1), β1 is a structure represented by the following formula (L-1) and m is 0.5.

[Chem. 57]

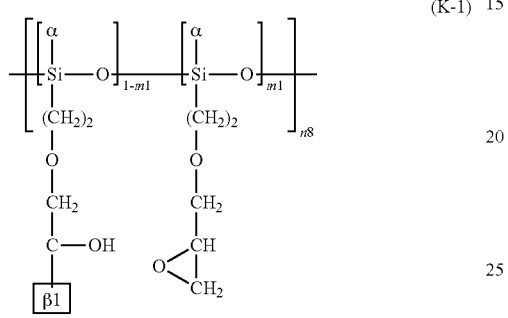
(K-1)

[Chem. 58]

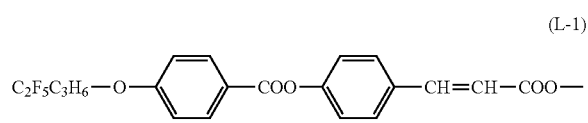
(L-1)

The liquid crystal alignment agent obtained was applied to each of the two ITO substrates, followed by pre-baking at 90° C. for five minutes and post-baking at 230° C. for 40 minutes, whereby bilayer-structured photoalignment films were obtained. Subsequently, the surfaces covered with the photoalignment films were irradiated with 20 J/cm$^2$ of linearly polarized ultraviolet light with a wavelength range of 320 to 380 nm, so that alignment treatment was performed. Each bilayer-structured photoalignment film consists of a lower layer formed from a polyimide not containing a photoreactive functional group, and an upper layer formed from a polysiloxane containing a photoreactive functional group (cinnamate group). The upper layer is in contact with the liquid crystal layer.

Next, an ultraviolet-curable sealant (product name: Photolec S-WB, available from Sekisui Chemical Co., Ltd.) was applied in a pattern to one of the substrates using a dispenser. A liquid crystal composition was dropped to a predetermined position of the other substrate. As the liquid crystal composition, a negative liquid crystal composition containing a liquid crystal material having negative anisotropy of dielectric constant, an epoxy-based monomer represented by the following formula (A-7), and a dihydrazide curing agent represented by the following formula (B-13) was used. The amount of the epoxy-based monomer was 0.3% by weight and the amount of the dihydrazide curing agent was 0.3% by weight, relative to the whole liquid crystal composition. Subsequently, the substrates were attached to each other in vacuum, and the sealant was irradiated with ultraviolet light with the display area shielded from the light. Thus, a liquid crystal cell was formed.

[Chem. 59]

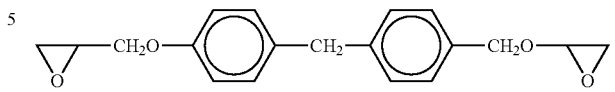
(A-7)

[Chem. 60]

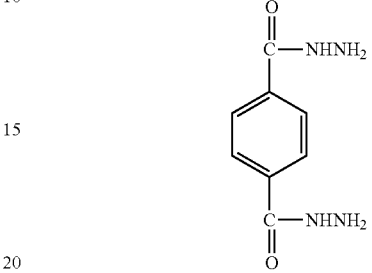
(B-13)

Subsequently, the liquid crystal cell was heated at 60° C. (a temperature lower than the nematic-isotropic transition temperature of the liquid crystal material and not lower than the curing reaction temperature at which the epoxy-based monomer reacts with the dihydrazide curing agent) for 120 minutes. Thus, polymer layers were formed by thermal polymerization between the epoxy-based monomer and the dihydrazide curing agent. Subsequently, in order to remove flow alignment of the liquid crystal, the liquid crystal cell was further heated at 130° C. (a temperature higher than the nematic-isotropic transition temperature of the liquid crystal material) for 40 minutes so that re-alignment treatment was performed to convert the liquid crystal into an isotropic phase. The liquid crystal cell was then cooled down to room temperature, whereby a VATN-mode liquid crystal cell was obtained.

COMPARATIVE EXAMPLE 5

A VATN-mode liquid crystal cell according to Comparative Example 5 was produced in the same manner as in Example 5, except for using, as the liquid crystal composition, a negative liquid crystal composition containing a liquid crystal material having negative anisotropy of dielectric constant and not containing either the epoxy-based monomer represented by the formula (A-7) or the dihydrazide curing agent represented by the formula (B-13).

<High-Temperature Test on Backlight>

For each of the VATN-mode liquid crystal cells produced in Example 5 and Comparative Example 5, the same evaluation test as in Example 1 was performed. Table 5 shows the results.

TABLE 5

|  | Before aging test | | After 5000-hour aging test | |
|---|---|---|---|---|
|  | VHR (%) | Contrast ratio | VHR (%) | Contrast ratio |
| Example 5 | 99.5 | 5000 | 99.5 | 5000 |
| Comparative Example 5 | 99.5 | 5000 | 96.4 | 4500 |

As shown in Table 5, the results of Example 5 reveal that the polymer layers formed by thermal polymerization using the epoxy-based monomer and the dihydrazide curing agent allowed the VHR and the contrast ratio to be maintained at high levels after the 5000-hour aging test in Example 5 in comparison with Comparative Example 5. The above indicates that the polymer layer formation in Example 5 was effective in preventing transfer of radicals generated in the cinnamate group-containing photoalignment films to the negative liquid crystal material, thus reducing or preventing a decrease in VHR and contrast ratio.

Example 6

An FFS-mode liquid crystal cell according to Example 6 was produced in the same manner as in Example 1, except that the amount of the epoxy-based monomer was 0.05% by weight and the amount of the diamine curing agent was 0.05% by weight, relative to the whole liquid crystal composition.

<High-Temperature Test on Backlight>

For the FFS-mode liquid crystal cell produced in Example 6, the same evaluation test as in Example 1 was performed. Table 6 shows the results.

TABLE 6

| | Before aging test | | After 5000-hour aging test | |
|---|---|---|---|---|
| | VHR (%) | Contrast ratio | VHR (%) | Contrast ratio |
| Example 6 | 99.3 | 1100 | 95.4 | 1000 |

As shown in Table 6, the results of Example 6 reveal that also when the amount of the epoxy-based monomer and the amount of the diamine curing agent were both 0.05% by weight, it was possible to reduce or prevent a decrease in VHR and contrast ratio at equivalent levels as those in Example 1.

(Additional Remarks)

One aspect of the present invention may provide a liquid crystal display device including: paired substrates; a liquid crystal layer disposed between the substrates; a photoalignment film disposed between at least one of the substrates and the liquid crystal layer; and a polymer layer disposed between the photoalignment film and the liquid crystal layer, wherein the polymer layer has a structure derived from a specific epoxy-based monomer represented by the following formula (1) and a structure derived from a specific curing agent represented by the following formula (2):

[Chem. 61]

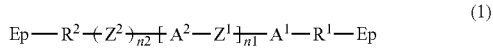

(1)

wherein Ep represents an epoxy group;

$R^1$ and $R^2$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$- group, or a direct bond;

$A^1$ and $A^2$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl group, or a C2-C18 unsaturated alkylene group;

—CH$_2$— groups of $A^1$ and $A^2$ are each optionally replaced by an —O— group or an —S— group as long as they are not adjacent to each other;

one or more hydrogen atoms of $A^1$ and $A^2$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

$Z^1$ represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$Z^2$ is a structure represented by the following formula (1-1);

n1 is 0, 1, 2, 3, 4, or 5; and n2 is 0 or 1,

[Chem. 62]

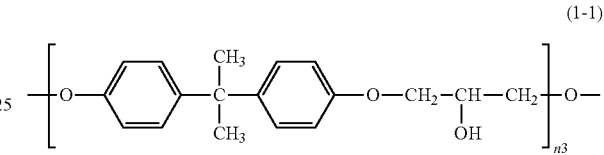

(1-1)

wherein n3 is an integer of 1 to 18,

[Chem. 63]

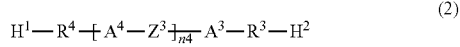

(2)

wherein $H^1$ and $H^2$ are the same as or different from each other and each represent an amino group, a dimethylamino group, a hydrazide group, or an imidazole group;

$R^3$ and $R^4$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$A^3$ and $A^4$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl group, a C2-C18 unsaturated alkylene group, or a —CO— or —CO—CO— group;

—CH$_2$— groups of $A^3$ and $A^4$ are each optionally replaced by an —O— group, an —S— group, or an —NH— group as long as they are not adjacent to each other;

one or more hydrogen atoms of $A^3$ and $A^4$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

$Z^3$ represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond; and n4 is 0, 1, 2, 3, 4, or 5.

Owing to the presence of the polymer layer between the liquid crystal layer and the photoalignment film, it is possible to reduce the region (area) where photoreactive functional groups in the photoalignment film are in direct contact with liquid crystal molecules in the liquid crystal layer. Thus, even if radicals are generated from photoreactive functional groups in the photoalignment film due to ultraviolet light or visible light emitted from the backlight, it is possible to prevent transfer of the radicals to the liquid crystal molecules. In addition, the epoxy-based monomer contains two epoxy groups in one molecule, and the curing agent contains two amino groups or the like in one molecule. Thus, heating the epoxy-based monomer and the curing agent can cause a reaction between one of the epoxy groups in the epoxy-based monomer and one of the amino groups or the like in the curing agent, forming a polymer. The other epoxy group in the epoxy-based monomer and the other amino group or the like in the curing agent can also each bind to functional groups in the photoalignment film, and can thus be incorporated into the polymer layer, preventing an unreacted part of the epoxy-based monomer and the curing agent from remaining in the liquid crystal layer.

Preferably, the epoxy-based monomer is a monomer represented by the following formula (3), and the curing agent is a monomer represented by the following formula (4):

[Chem. 64]

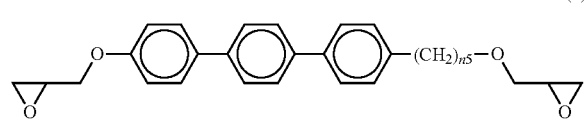
(3)

wherein n5 is an integer of 1 to 6,

[Chem. 65]

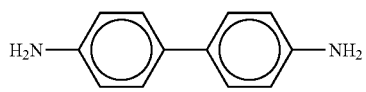
(4)

Preferably, the photoalignment film contains a photoreactive functional group-containing polymer, and the photoreactive functional group is an azobenzene group, a chalcone group, or a cinnamate group.

These photoreactive functional groups absorb light in the wavelength region of 360 nm or more, and may be thus decomposed into radicals by light emitted in the photoalignment treatment or light from the backlight during use of the liquid crystal display device. Thus, when the photoreactive functional group is an azobenzene group, a chalcone group, or a cinnamate group, it is possible to more effectively reduce or prevent a decrease in VHR and contrast ratio.

The photoalignment film preferably contains a polymer containing a carboxyl group. The photoreactive functional group-containing polymer may further contain a carboxyl group. More preferably, the carboxyl group and the epoxy-based monomer are bonded to each other. Heating the liquid crystal layer allows a carboxyl group in the polymer containing a carboxyl group and/or the photoreactive functional group-containing polymer in the photoalignment film to thermally react with and bind to an epoxy group constituting the polymer layer. Thus, a chemical bond can be formed between the photoalignment film and the polymer layer, significantly lowering the possibility of partial dissolution of the polymer constituting the polymer layer into the liquid crystal layer. This makes it possible to more effectively reduce or prevent a decrease in VHR and contrast ratio.

The photoalignment film preferably contains a polymer containing an epoxy group. The photoreactive functional group-containing polymer may further contain an epoxy group. More preferably, the epoxy group and the curing agent are bonded to each other. Heating the liquid crystal layer allows an epoxy group in the polymer containing an epoxy group and/or the photoreactive functional group-containing polymer in the photoalignment film to thermally react with and bind to an amino group or the like in the curing agent in the polymer layer. Thus, a chemical bond can be formed between the photoalignment film and the polymer layer, significantly lowering the possibility of partial dissolution of the polymer constituting the polymer layer into the liquid crystal layer. This makes it possible to more effectively reduce or prevent a decrease in VHR and contrast ratio.

The photoalignment film preferably contains a polymer selected from the group consisting of a polyamic acid, a polyimide, a polysiloxane, a polyvinyl, and polymaleimide. These polymers can increase the weight average molecular weight at the polymer synthesis stage. Thus, the presence of these polymers in the photoalignment film enables a further reduction in image sticking (decrease in VHR and occurrence of residual DC voltage) resulting from impurities due to dissolution of a low molecular weight component into the liquid crystal layer during use of the liquid crystal display device.

The liquid crystal layer preferably contains a liquid crystal material having negative anisotropy of dielectric constant.

Radicals generated from photoreactive functional groups in the photoalignment film are easily transferred to a liquid crystal material having negative anisotropy of dielectric constant. Thus, it is possible to more effectively reduce or prevent a decrease in VHR and contrast ratio when a liquid crystal material having negative dielectric anisotropy is used than when a liquid crystal material having positive dielectric anisotropy is used.

The display mode of the liquid crystal display device is preferably a twisted nematic (TN) mode, an electrically controlled birefringence (ECB) mode, an in-plane switching (IPS) mode, a fringe-field switching (FFS) mode, a vertical alignment (VA) mode, or a vertical alignment twisted nematic (VATN) mode.

According to another aspect, the present invention may provide a method for producing a liquid crystal display device, including: forming a photoalignment film on at least one of paired substrates; enclosing a liquid crystal composition containing a liquid crystal material, an epoxy-based monomer represented by the following formula (A), and a curing agent represented by the following formula (B) between the paired substrates including a photoalignment film formed on at least one of the substrates so as to form a liquid crystal layer; and thermally curing the epoxy-based monomer to form a polymer layer between the photoalignment film and the liquid crystal layer through a reaction between the epoxy-based monomer and the curing agent by heating the liquid crystal layer:

[Chem. 66]

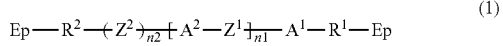
(1)

wherein Ep represents an epoxy group;

$R^1$ and $R^2$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$A^1$ and $A^2$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl, or a C2-C18 unsaturated alkylene group;

—CH$_2$— groups of $A^1$ and $A^2$ are each optionally replaced by an —O— group or an —S— group as long as they are not adjacent to each other;

one or more hydrogen atoms of $A^1$ and $A^2$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$Z^2$ has a structure represented by the following formula (1-1);

n1 is 0, 1, 2, 3, 4, or 5; and n2 is 0 or 1,

[Chem. 67]

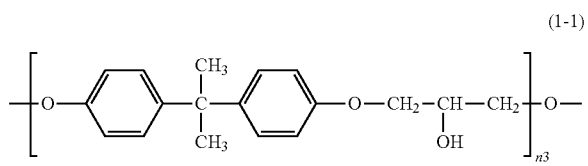
(1-1)

wherein n3 is an integer of 1 to 18,

[Chem. 68]

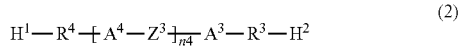
(2)

wherein $H^1$ and $H^2$ are the same as or different from each other and each represent an amino group, a dimethylamino group, a hydrazide group, or an imidazole group;

$R^3$ and $R^4$ are the same as or different from each other and each represent an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond;

$A^3$ and $A^4$ are the same as or different from each other and each represent a 1,4-phenylene group, a naphthalene-1,4-diyl group, a naphthalene-2,6-diyl group, a 1,4-cyclohexylene group, a C2-C18 alkyl group, a C2-C18 alkylene group, a C2-C18 unsaturated alkyl group, a C2-C18 unsaturated alkylene group, or a —CO— or —CO—CO— group;

—CH$_2$— groups of $A^3$ and $A^4$ are each optionally replaced by an —O— group, an —S— group, or an —NH— group as long as they are not adjacent to each other;

one or more hydrogen atoms of $A^3$ and $A^4$ are each optionally replaced by a fluorine atom, a chlorine atom, a —CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

$Z^3$ represents an —O— group, an —S— group, an —NH— group, a —CO— group, a —COO— group, an —OCO— group, an —NHCO— group, a —CONH— group, a —CH$_2$— group, a —CH(CH$_3$)— group, a —C(CH$_3$)$_2$— group, a —CF$_2$— group, or a direct bond; and n4 is 0, 1, 2, 3, 4, or 5.

The method includes thermal curing to form a polymer layer between the photoalignment film and the liquid crystal layer through a reaction between the epoxy-based monomer and the curing agent by heating the liquid crystal layer. Thus, it is possible to reduce the region (area) where photoreactive functional groups in the photoalignment film are in direct contact with liquid crystal molecules in the liquid crystal layer. Thus, even if radicals are generated from photoreactive functional groups in the photoalignment film due to ultraviolet light or visible light emitted from the backlight, it is possible to prevent transfer of the radicals to the liquid crystal molecules. In addition, since the polymer layer is formed by thermal polymerization between the epoxy-based monomer and the curing agent, it is unnecessary to irradiate the liquid crystal layer with light when forming the polymer layer. Thus, it is possible to suppress generation of radicals from the photoalignment film when forming the polymer layer.

Preferably, thermal curing is performed at a temperature lower than the nematic-isotropic transition temperature of the liquid crystal material and not lower than the curing reaction temperature at which the epoxy-based monomer reacts with the curing agent.

Preferably, the photoalignment film contains a photoreactive functional group-containing polymer, and the photoreactive functional group-containing polymer is irradiated with polarized ultraviolet light during the forming of a photoalignment film.

The photoreactive functional group is preferably an azobenzene group, a chalcone group, or a cinnamate group.

These photoreactive functional groups absorb light in the wavelength region of 360 nm or more, and may be thus decomposed into radicals by light emitted in the photoalignment treatment or light from the backlight during use of the liquid crystal display device. Thus, it is possible to more effectively reduce or prevent a decrease in VHR and contrast ratio when the photoreactive functional group is an azobenzene group, a chalcone group, or a cinnamate group.

The photoalignment film preferably contains a polymer containing a carboxyl group. The photoreactive functional group-containing polymer may further contain a carboxyl group. More preferably, a bond is formed between the carboxyl group and the epoxy-based monomer by heating the liquid crystal layer. Heating the liquid crystal layer allows a carboxyl group in the polymer containing a carboxyl group and/or the photoreactive functional group-containing polymer in the photoalignment film to thermally react with and bind to an epoxy group constituting the polymer layer. Thus, a chemical bond can be formed between the photoalignment film and the polymer layer, significantly lowering the possibility of partial dissolution of the polymer constituting the polymer layer into the liquid crystal layer. This makes it possible to more effectively reduce or prevent a decrease in VHR and contrast ratio.

The photoalignment film preferably contains a polymer containing an epoxy group. The photoreactive functional group-containing polymer preferably further contains an epoxy group. More preferably, a bond is formed between the epoxy group and the curing agent by heating the liquid crystal layer. Heating the liquid crystal layer allows an epoxy group in the polymer containing an epoxy group and/or the photoreactive functional group-containing polymer in the photoalignment film to thermally react with and bind to an amino group or the like in the curing agent in the polymer layer. Thus, a chemical bond can be formed between the photoalignment film and the polymer layer, significantly lowering the possibility of partial dissolution of the polymer constituting the polymer layer into the liquid crystal layer. This makes it possible to more effectively reduce or prevent a decrease in VHR and contrast ratio.

The photoalignment film preferably contains a polymer selected from the group consisting of a polyamic acid, a polyimide, a polysiloxane, a polyvinyl, and polymaleimide. These polymers can increase the weight average molecular weight at the polymer synthesis stage. Thus, the presence of these polymers in the photoalignment film enables a further reduction in image sticking (decrease in VHR and occurrence of residual DC voltage) resulting from impurities due to dissolution of a low molecular weight component into the liquid crystal layer during use of the liquid crystal display device.

The liquid crystal layer preferably contains a liquid crystal material having negative anisotropy of dielectric constant.

Radicals generated from the photoreactive functional groups in the photoalignment film are easily transferred to a liquid crystal material having negative anisotropy of dielectric constant. Thus, it is possible to more effectively reduce or prevent a decrease in VHR and contrast ratio when a liquid crystal material having negative dielectric anisotropy is used than when a liquid crystal material having positive dielectric anisotropy is used.

The display mode of the liquid crystal display device is preferably a twisted nematic (TN) mode, an electrically controlled birefringence (ECB) mode, an in-plane switching (IPS) mode, a fringe-field switching (FFS) mode, a vertical alignment (VA) mode, or a vertical alignment twisted nematic (VATN) mode.

The embodiments of the present invention described above may appropriately be combined within the spirit of the present invention.

REFERENCE SIGNS LIST

10, 20: substrate
30: liquid crystal layer
31: epoxy-based monomer
32: curing agent
33: radical scavenger
40: photoalignment film
50: polymer layer
60: seal
70: polarizer
80: backlight
100, 200, 300: liquid crystal display device

The invention claimed is:

1. A liquid crystal display device comprising:
paired substrates;
a liquid crystal layer disposed between the substrates;
a photoalignment film disposed between at least one of the substrates and the liquid crystal layer; and
a polymer layer disposed between the photoalignment film and the liquid crystal layer,
wherein the polymer layer has a structure derived from an epoxy-based monomer represented by the following formula (1) and a structure derived from a curing agent represented by the following formula (2):

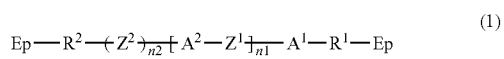

(1)

wherein Ep represents an epoxy group;
$R^1$ and $R^2$ are the same as or different from each other and each represent an O group, an S group, an NH group, a CO group, a COO group, an OCO group, an NHCO group, a CONH group, a $CH_2$ group, a $CH(CH_3)$ group, a $C(CH_3)_2$ group, a $CF_2$ group, or a direct bond;
$A^1$ and $A^2$ are the same as or different from each other and each represent a 1,4-phenylene group, a naphthalene-1,4-diyl group, a naphthalene-2,6-diyl group, a 1,4-cyclohexylene group, a C2-C18 alkylene group, or a C2-C18 unsaturated alkylene group;
$CH_2$ groups of $A^1$ and $A^2$ are each optionally replaced by an O group or an S group as long as they are not adjacent to each other;
one or more hydrogen atoms of $A^1$ and $A^2$ are each optionally replaced by a fluorine atom, a chlorine atom, a CN group, a C1-C6 alkyl group, a C1-C6 alkoxy group, a C1-C6 alkylcarbonyl group, a C1-C6 alkoxycarbonyl group, or a C1-C6 alkylcarbonyloxy group;
$Z^1$ represents an O group, an S group, an NH group, a CO group, a COO group, an OCO group, an NHCO group, a CONH group, a $CH_2$ group, a $CH(CH_3)$ group, a $C(CH_3)_2$ group, a $CF_2$ group, or a direct bond;
$Z^2$ is a structure represented by the following formula (1-1);
n1 is 0, 1, 2, 3, 4, or 5; and
n2 is 0 or 1,

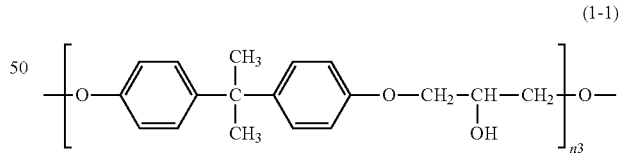

(1-1)

wherein n3 is an integer of 1 to 18,

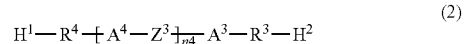

(2)

wherein $H^1$ and $H^2$ are the same as or different from each other and each represent an amino group, a dimethylamino group, a hydrazide group, or an imidazole group;
$R^3$ and $R^4$ are the same as or different from each other and each represent an O group, an S group, an NH group, a CO group, a COO group, an OCO group, an NHCO group, a CONH group, a CH₂ group, a CH(CH₃) group, a C(CH₃)₂ group, a CF₂ group, or a direct bond;

A³ and A⁴ are the same as or different from each other and each represent a 1,4-phenylene group, a naphthalene-1,4-diyl group, a naphthalene-2,6-diyl group, a 1,4-cyclohexylene group, a C2-C18 alkylene group, a C2-C18 unsaturated alkylene group, or a CO or CO—CO group;

CH₂ groups of A³ and A⁴ are each optionally replaced by an O group, an S group, or an NH group as long as they are not adjacent to each other;

one or more hydrogen atoms of A³ and A⁴ are each optionally replaced by a fluorine atom, a chlorine atom, a CN group, a C1-C6 alkyl group, a C1-C6 alkoxy group, a C1-C6 alkylcarbonyl group, a C1-C6 alkoxycarbonyl group, or a C1-C6 alkylcarbonyloxy group;

Z³ represents an O group, an S group, an NH group, a CO group, a COO group, an OCO group, an NHCO group, a CONH group, a CH₂ group, a CH(CH₃) group, a C(CH₃)₂ group, a CF₂ group, or a direct bond; and n4 is 0, 1, 2, 3, 4, or wherein the epoxy-based monomer is a monomer represented by the following formula (3), and the curing agent is a monomer represented by the following formula (4):

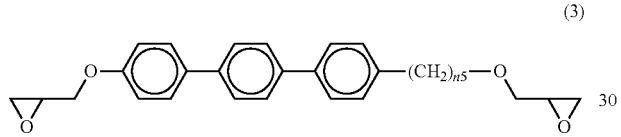

(3)

wherein n5 is an integer of 1 to 6,

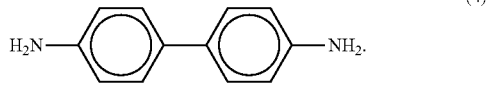

(4)

2. The liquid crystal display device according to claim 1, wherein the photoalignment film contains a photoreactive functional group-containing polymer, and the photoreactive functional group is an azobenzene group, a chalcone group, or a cinnamate group.

3. The liquid crystal display device according to claim 2, wherein the photoreactive functional group-containing polymer further contains a carboxyl group.

4. The liquid crystal display device according to claim 2, wherein the photoreactive functional group-containing polymer further contains an epoxy group.

5. The liquid crystal display device according to claim 1, wherein the photoalignment film contains a polymer containing a carboxyl group.

6. The liquid crystal display device according to claim 1, wherein the photoalignment film contains a polymer containing an epoxy group.

7. The liquid crystal display device according to claim 3, wherein the carboxyl group and the epoxy-based monomer are bonded to each other.

8. The liquid crystal display device according to claim 4, wherein the epoxy group and the curing agent are bonded to each other.

9. The liquid crystal display device according to claim 1, wherein the photoalignment film contains a polymer selected from the group consisting of a polyamic acid, a polyimide, a polysiloxane, a polyvinyl, and polymaleimide.

10. The liquid crystal display device according to claim 1, wherein the liquid crystal layer contains a liquid crystal material having negative anisotropy of dielectric constant.

11. The liquid crystal display device according to claim 1, wherein the display mode of the liquid crystal display device is a twisted nematic (TN) mode, an electrically controlled birefringence (ECB) mode, an in-plane switching (IPS) mode, a fringe-field switching (FFS) mode, a vertical alignment (VA) mode, or a vertical alignment twisted nematic (VATN) mode.

\* \* \* \* \*